US010294349B2

(12) United States Patent
Miyazaki et al.

(10) Patent No.: US 10,294,349 B2
(45) Date of Patent: May 21, 2019

(54) RUBBER COMPOSITION FOR TIRE, PNEUMATIC TIRE, AND METHOD FOR MANUFACTURING RUBBER COMPOSITION FOR TIRE

(71) Applicant: SUMITOMO RUBBER INDUSTRIES, LTD., Kobe-shi, Hyogo (JP)

(72) Inventors: Tatsuya Miyazaki, Kobe (JP); Ryuichi Tokimune, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 33 days.

(21) Appl. No.: 15/124,754

(22) PCT Filed: Oct. 21, 2014

(86) PCT No.: PCT/JP2014/077932
§ 371 (c)(1),
(2) Date: Sep. 9, 2016

(87) PCT Pub. No.: WO2015/145843
PCT Pub. Date: Oct. 1, 2015

(65) Prior Publication Data
US 2017/0015812 A1 Jan. 19, 2017

(30) Foreign Application Priority Data
Mar. 26, 2014 (JP) ................ 2014-064137

(51) Int. Cl.
| C08K 5/18 | (2006.01) |
| B60C 1/00 | (2006.01) |
| C08J 3/22 | (2006.01) |
| C08K 3/36 | (2006.01) |
| C08L 9/00 | (2006.01) |
| C08L 71/02 | (2006.01) |
| C08K 5/101 | (2006.01) |
| C08K 5/11 | (2006.01) |
| C08K 13/02 | (2006.01) |
| C08L 7/00 | (2006.01) |
| C08K 5/103 | (2006.01) |
| C08K 5/47 | (2006.01) |

(52) U.S. Cl.
CPC .............. C08K 5/18 (2013.01); B60C 1/00 (2013.01); B60C 1/0016 (2013.01); B60C 1/0025 (2013.01); C08J 3/22 (2013.01); C08K 3/36 (2013.01); C08K 5/101 (2013.01); C08K 5/103 (2013.01); C08K 5/11 (2013.01); C08K 5/47 (2013.01); C08K 13/02 (2013.01); C08L 7/00 (2013.01); C08L 9/00 (2013.01); C08L 71/02 (2013.01); B60C 2001/005 (2013.01); C08J 2307/00 (2013.01); C08J 2321/00 (2013.01); C08J 2409/00 (2013.01); C08K 2201/006 (2013.01)

(58) Field of Classification Search
CPC ... C08J 3/22; C08K 3/36; C08K 5/101; C08K 5/11; C08K 5/18; C08K 13/02

USPC .......................................... 523/351; 524/492
See application file for complete search history.

(56) References Cited

U.S. PATENT DOCUMENTS

| 6,013,737 | A | * | 1/2000 | Takagishi | ................. | C08K 3/36 |
| | | | | | | 524/492 |
| 2012/0285599 | A1 | | 11/2012 | Miyazaki | | |
| 2013/0184387 | A1 | * | 7/2013 | Tahara | .................. | B60C 1/0016 |
| | | | | | | 524/110 |
| 2013/0331498 | A1 | | 12/2013 | Miyazaki | | |

FOREIGN PATENT DOCUMENTS

| CN | 103097449 A | 5/2013 |
| EP | 1757658 A1 | 2/2007 |
| JP | 63-213536 A | 9/1988 |
| JP | 63-213538 A | 9/1988 |
| JP | 5-194790 A | 8/1993 |
| JP | 2012-036351 A | 2/2012 |
| JP | 2012-057153 A | 3/2012 |
| JP | 2012-111795 A | 6/2012 |
| JP | 2014-31419 A | 2/2014 |
| WO | WO 03/022914 A1 | 3/2003 |
| WO | WO 2010/124977 A1 | 4/2010 |

OTHER PUBLICATIONS

International Search Report (PCT/ISA/210) issued in PCT/JP2014/077932, dated Jan. 20, 2015.
Written Opinion (PCT/ISA/237) issued in PCT/JP2014/077932, dated Jan. 20, 2015.
English Translation of the Chinese Office Action for Chinese Application No. 201480077103.6, dated Nov. 7, 2017.
Meng, "New Fine Chemical Application Formula 10000 Cases and Practical Handbook of Production Technology," Silver Voice Audio-Visual Publishing House, Feb. 2004, pp. 695-696 (4 pages total).
Song, "The Technology of Fine Chemical Industry," Tianjin University Press, Sep. 2008, pp. 61-62 (4 pages total).

* cited by examiner

*Primary Examiner* — Edward J Cain
(74) *Attorney, Agent, or Firm* — Birch, Stewart, Kolasch & Birch LLP

(57) ABSTRACT

Provided is a rubber composition for tires which can prevent discoloration and improve ozone resistance while maintaining or improving good elongation at break, and further can be produced with high efficiency. Also provided are a pneumatic tire formed from the same, and a method for producing the same. Included is a rubber composition for tires, including: a rubber component; a phenylenediamine antioxidant; and a masterbatch, the masterbatch containing a specific nonionic surfactant and a silica having a BET value of 40-250 $m^2/g$ at a mass ratio of 1:5 to 1:0.15, the rubber component containing a diene rubber in an amount of 70-100% by mass per 100% by mass of the rubber component, the rubber composition including, per 100 parts by mass of the rubber component, 1.0-10.0 parts by mass of the phenylenediamine antioxidant and 0.1-5.0 parts by mass of the nonionic surfactant introduced in the form of the masterbatch.

11 Claims, No Drawings

RUBBER COMPOSITION FOR TIRE, PNEUMATIC TIRE, AND METHOD FOR MANUFACTURING RUBBER COMPOSITION FOR TIRE

TECHNICAL FIELD

The present invention relates to rubber compositions for tires, pneumatic tires formed from the rubber compositions for tires, and methods for producing the rubber compositions for tires.

BACKGROUND ART

Automobile tires are formed using rubber compositions made from natural rubber and synthetic diene rubbers. The degradation of such tires is accelerated by high ozone or oxygen levels or by ultraviolet rays, which may result in cracks in the tires. In order to suppress crack formation and propagation in the presence of ozone, for example, antioxidants such as N-(1,3-dimethylbutyl)-N'-phenyl-p-phenylenediamine (6PPD) or poly(2,2,4-trimethyl-1,2-)dihydroquinoline (TMDQ) are incorporated in rubber compositions.

The antioxidants in rubber vulcanizates migrate (bloom) to the rubber surface of for example tires, thereby protecting the rubber from ozone. Unfortunately, excessive blooming of the antioxidants in a short period of time causes white discoloration. Moreover, the antioxidants oxidized by ozone cause brown discoloration, and they excessively bloom as above, thus intensifying the brown discoloration. Furthermore, if the wax, antioxidants, and other components deposited on the tire surface form an uneven bloom layer (surface-protecting layer), diffuse reflection of light occurs, making the brown discoloration caused by the degraded antioxidants more noticeable. It has thus been difficult to improve ozone resistance while preventing discoloration.

Patent Literature 1 describes that the incorporation of a polyoxyethylene ether nonionic surfactant prevents deterioration of the appearance of tires. However, no technique has been developed that satisfies all the properties: fuel economy, durability (discoloration resistance and ozone resistance), and high tensile strength.

CITATION LIST

Patent Literature

Patent Literature 1: JP H05-194790 A

SUMMARY OF INVENTION

Technical Problem

The present inventors have made extensive studies and found that incorporating a specific nonionic surfactant into a rubber composition for tires containing a diene rubber and a phenylenediamine antioxidant sufficiently prevents brown discoloration and white discoloration of the tire surface, thus providing excellent ozone resistance. Such specific nonionic surfactants internally contain a large number of ether linkages which facilitate molecular rotation, and also internally contain a large number of oxygen-attracting groups which provide high polarity, and therefore the specific nonionic surfactants are more likely to bloom to the tire surface. These nonionic surfactants bloom to the tire surface together with antioxidants and dissolve and flatten them. This is considered to diminish white discoloration, and at the same time to reduce irregularities on the surface-protecting layer formed on the tire surface, thus greatly diminishing brown discoloration, which is noticeable under diffuse reflection. Also, shiny black luster is imparted to the tire surface. Moreover, ozone resistance is improved.

Rubber compositions for tires are produced through two kneading steps: a step of mixing and kneading a rubber component and other additives such as an antioxidant or filler (hereinafter, also referred to as "base kneading step") and a step of adding a vulcanizing agent to the mixture obtained in the base kneading step and kneading them (hereinafter, also referred to as "final kneading step"). Here, large commercial Banbury mixers require special precision micro syringes to introduce a small amount of the above nonionic surfactants or other chemical agents which are liquid at room temperature (23° C.) before kneading. This unfortunately increases investment costs. Also, since compositions incorporating surfactants have reduced viscosity and generate lower kneading torque, they unfortunately require a longer kneading time, resulting in deterioration of productivity. To prevent such viscosity reduction, an additional procedure, such as controlling the amount of process oil, is required, leading to increased costs.

In order to solve the above problems, the inventors have studied an approach of preliminarily mixing a nonionic surfactant and carbon black to prepare a masterbatch, adding the masterbatch to a rubber component and other components, and kneading them. Since carbon black has fine pores and thus has a high adsorption capacity, when carbon black and a surfactant are mixed at a certain ratio to prepare a masterbatch, the carbon black adsorbs the nonionic surfactant to form powder or a viscous solid at room temperature. The surfactant in the form of such a masterbatch can be incorporated into a rubber composition without using precision micro syringes. However, carbon black is known to cause environmental degradation and neighborhood pollution in the production process. Moreover, unless carbon black is sufficiently uniformly dispersed in a rubber component it can act as fracture nuclei, thereby reducing elongation at break (EB). In order to sufficiently uniformly disperse carbon black in a rubber component, the masterbatch needs to be introduced in the base kneading step. However, the introduction of a minor component in the base kneading step is disadvantageous from a productivity point of view (as since the surfactant itself can cause rotor slip or viscosity reduction, its introduction in the base kneading step is undesirable). Thus there is a need for a strategy to ensure sufficient dispersion even when the nonionic surfactant is introduced in the final kneading step, without causing environmental degradation, neighborhood pollution, and reduction in kneading productivity.

The present invention aims to solve the above problem and provide a rubber composition for tires which can prevent discoloration and improve ozone resistance while maintaining or improving good elongation at break, and further can be produced with high efficiency, as well as a pneumatic tire formed from the rubber composition for tires, and a method for producing the rubber composition for tires.

Particularly in the case where a large amount of carbon black or stearic acid or a small amount of silica is used, the scorch time decreases so that compound scorch tends to occur during extrusion. For this reason, the vulcanization retarder PVI (N-(cyclohexylthio) phthalimide) is incorporated in an amount that does not cause blooming during processing to control the cure rate. However, since PVI has low solubility in rubber and is likely to bloom as a white matter to the SW surface during extrusion at high temperatures or during storage in a hot and wet environment after tire vulcanization, a small amount (0.1 parts by mass or less per 100 parts by mass of the rubber component) of PVI or no PVI, if possible, should be used. Therefore, it is required for high carbon black or stearic acid formulations, such as general sidewall formulations, to suppress discoloration and ozone cracking while improving processability.

The present invention thus also aims to solve the above problem and provide a rubber composition for tires which can prevent discoloration and improve ozone resistance and is also excellent in processability, as well as a pneumatic tire formed from the rubber composition for tires, and a method for producing the rubber composition for tires.

Solution to Problem

The first aspect of the present invention relates to a rubber composition for tires, including: a rubber component; a phenylenediamine antioxidant; and a masterbatch, the masterbatch containing a nonionic surfactant and a silica having a BET value of 40 to 250 m²/g at a mass ratio of 1:5 to 1:0.15, the nonionic surfactant being at least one selected from the group consisting of Pluronic type nonionic surfactants and nonionic surfactants represented by at least one of Formula (1) or Formula (2) below, the rubber component containing a diene rubber in an amount of 70% to 100% by mass based on 100% by mass of the rubber component, the rubber composition containing, per 100 parts by mass of the rubber component, 1.0 to 10.0 parts by mass of the phenylenediamine antioxidant and 0.1 to 5.0 parts by mass of the nonionic surfactant introduced in the form of the masterbatch,

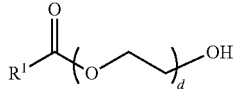

(1)

wherein R¹ represents a C6-C26 hydrocarbon group, and d represents an integer,

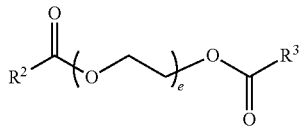

(2)

wherein R² and R³ are the same as or different from one another and each represent a C6-C26 hydrocarbon group, and e represents an integer.

Preferably, the silica used in the masterbatch has a BET value of 110 to 200 m²/g, and the masterbatch contains the nonionic surfactant and the silica at a mass ratio of 1:1.5 to 1:0.2.

The masterbatch is preferably introduced in a final kneading step.

The second aspect of the present invention relates to a rubber composition for tires, including: a rubber component; a phenylenediamine antioxidant; at least one nonionic surfactant selected from the group consisting of Pluronic type nonionic surfactants and nonionic surfactants represented by at least one of Formula (1) or Formula (2) below; carbon black; silica; stearic acid; and a vulcanization accelerator represented by Formula (3) below, the rubber component containing a diene rubber in an amount of 70% to 100% by mass based on 100% by mass of the rubber component, the rubber composition containing, per 100 parts by mass of the rubber component, 1.0 to 10.0 parts by mass of the phenylenediamine antioxidant, a total of 0.1 to 5.0 parts by mass of the at least one nonionic surfactant, 46 parts by mass or more of the carbon black, 15 parts by mass or less of the silica, and 2.2 to 4.0 parts by mass of the stearic acid,

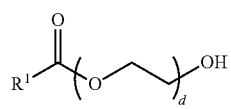

(1)

wherein R¹ represents a C6-C26 hydrocarbon group, and d represents an integer,

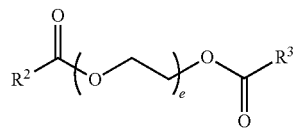

(2)

wherein R² and R³ are the same as or different from one another and each represent a C6-C26 hydrocarbon group, and e represents an integer,

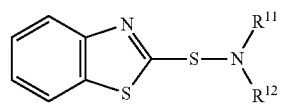

(3)

wherein $R^{11}$ represents a C2-C16 alkyl group, and $R^{12}$ represents a C3-C16 branched alkyl group or a benzothiazolylsulfide group.

The rubber compositions for tires according to the first and second aspects of the present invention each preferably further contain a petroleum-based wax in an amount of 0 to 6.0 parts by mass per 100 parts by mass of the rubber component.

Preferably, the petroleum-based wax contains, based on 100% by mass of the petroleum-based wax, a total of 25% to 50% by mass of C20 to C32 normal alkanes and a total of 25% to 50% by mass of C33 to C44 normal alkanes.

The rubber compositions for tires according to the first and second aspects of the present invention are each preferably for use in outer layers of tires.

The present invention also relates to a pneumatic tire formed from the rubber composition for tires of the first or second aspect of the present invention.

The present invention also relates to a method for producing a rubber composition for tires, the method including: a base kneading step including mixing and kneading a rubber component and a phenylenediamine antioxidant; and a final kneading step including adding a vulcanizing agent and a masterbatch to a mixture obtained in the base kneading step and kneading them, the masterbatch containing a nonionic surfactant and a silica having a BET value of 40 to 250 m²/g at a mass ratio of 1:5 to 1:0.15, the nonionic surfactant being at least one selected from the group consisting of Pluronic type nonionic surfactants and nonionic surfactants represented by at least one of Formula (1) or Formula (2) below,

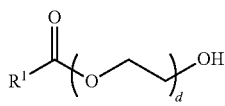

(1)

wherein $R^1$ represents a C6-C26 hydrocarbon group, and d represents an integer,

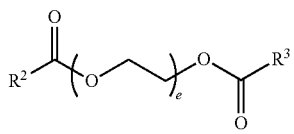

(2)

wherein $R^2$ and $R^3$ are the same as or different from one another and each represent a C6-C26 hydrocarbon group, and e represents an integer.

Advantageous Effects of Invention

The first aspect of the present invention is a rubber composition for tires which incorporates a masterbatch containing a specific nonionic surfactant and a silica powder having a specific BET range, together with a diene rubber and a phenylenediamine antioxidant. Such a rubber composition can prevent discoloration and improve ozone resistance while maintaining or improving good elongation at break, and further can be produced with high efficiency. In addition, it is excellent in processability.

The second aspect of the present invention is a rubber composition for tires which includes predetermined amounts of a rubber component, a phenylenediamine antioxidant, a specific nonionic surfactant, carbon black, silica, stearic acid, and a specific vulcanization accelerator. Such a rubber composition can prevent discoloration and improve ozone resistance and is also excellent in processability.

DESCRIPTION OF EMBODIMENTS

[Rubber Composition for Tires of the First Aspect of the Present Invention]

The rubber composition for tires of the first aspect of the present invention is provided by incorporating a specific nonionic surfactant into a rubber composition for tires containing a diene rubber and a phenylenediamine antioxidant. Such a rubber composition can sufficiently prevent brown discoloration and white discoloration on the tire surface, probably due to the following reason. The specific surfactant blooms to the tire surface together with the antioxidant and dissolves and flattens it. This is considered to diminish white discoloration, and at the same time to reduce irregularities on the surface-protecting layer formed on the tire surface, thus greatly diminishing brown discoloration, which is noticeable under diffuse reflection. Also, shiny black luster is imparted to the tire surface. Moreover, ozone resistance is improved. Furthermore, scorch or compound scorch can be suppressed even with high carbon black or stearic acid content, resulting in good processability.

The rubber composition for tires of the present invention incorporates the nonionic surfactant in the form of a masterbatch containing the nonionic surfactant and a silica having a specific BET range. Since silica has a high adsorption capacity like carbon black, when silica and a surfactant are mixed at a certain ratio to prepare a masterbatch, the silica adsorbs the nonionic surfactant to form powder or a viscous solid at room temperature. The surfactant in the form of such a masterbatch can be incorporated into a rubber composition without using precision micro syringes. At the same time, silica less self-aggregates than carbon black and can be relatively readily dispersed uniformly even in a rubber component. Accordingly, silica can be introduced in the final kneading step, thereby resulting in greatly improved productivity.

The rubber composition for tires of the present invention includes a rubber component.

Examples of the rubber component include diene rubbers such as isoprene-based rubbers, polybutadiene rubber (BR), styrene-butadiene rubber (SBR), styrene-isoprene-butadiene rubber (SIBR), chloroprene rubber (CR), and acrylonitrile butadiene rubber (NBR), and non-diene rubbers such as ethylene-propylene-diene rubber (EPDM), butyl rubber (IIR) and halogenated butyl rubber (X-IIR). Each of these may be used alone, or two or more of these may be used in combination. Preferred among the above are diene rubbers because they can be suitably used for tires. Preferred among the diene rubbers are isoprene-based rubbers, BR, and SBR, with combinations of isoprene-based rubbers and BR being more preferred, because they provide good durability while ensuring good handling stability, good fuel economy, and good elongation at break. In the case where the rubber composition is used in sidewalls or clinches, isoprene-based rubbers are preferred for good tensile strength, while BR is preferred for high crack growth resistance. In the case where the rubber composition is used in treads, SBR is preferred for high grip performance.

The amount of diene rubber based on 100% by mass of the rubber component is 70% by mass or more, preferably 80% by mass or more, more preferably 90% by mass or more, and may be 100% by mass. When the amount of diene rubber is within the range indicated above, the resulting rubber composition can suitably exert the effects of the present invention and can also be suitably used for tires.

Examples of the isoprene-based rubbers include synthetic polyisoprene rubber (IR), natural rubber (NR), and modified natural rubbers. NR includes deproteinized natural rubber (DPNR) and highly purified natural rubber (UPNR). Examples of modified natural rubbers include epoxidized natural rubber (ENR), hydrogenated natural rubber (HNR), and grafted natural rubber. Examples of the NR include those commonly used in the tire industry, such as SIR20, RSS#3, TSR10, and TSR20. Among these, TSR20 or IR is preferred.

The amount of isoprene-based rubber based on 100% by mass of the rubber component is preferably 10% to 80% by mass. In this case, good crack growth resistance and good tensile strength can be obtained.

In the case where the rubber composition for tires of the present invention is used in sidewalls or clinches, the amount of isoprene-based rubber based on 100% by mass of the rubber component is preferably 20% by mass or more, more preferably 30% by mass or more. When the amount is less than 20% by mass, sufficient mechanical strength may not be achieved. The amount of isoprene-based rubber is preferably 80% by mass or less, more preferably 70% by mass or less. When the amount is more than 80% by mass, crack growth resistance and other properties may decrease. Although the same amount of isoprene-based rubber may be used in the case where the rubber composition of the present invention is used in treads or other components, the amount may be varied appropriately depending on whether the intended use is for passenger vehicles or for trucks or buses.

The BR is not particularly limited, and BRs commonly used in the tire industry may be used, such as high-cis content BRs such as BR 1220 available from Zeon Corporation, and BR130B and BR150B both available from Ube Industries, Ltd.; BRs containing 1,2-syndiotactic polybutadiene crystals (SPB) such as VCR412 and VCR617 both available from Ube Industries, Ltd.; and polybutadiene rubbers synthesized using rare earth catalysts (rare earth-catalyzed BRs). Tin-modified polybutadiene rubbers (tin-modified BRs) produced by modification with tin compounds can also be used. In particular, BRs having a cis content of 95% by mass or more are preferred. Also preferred are combinations of SPB-containing BRs and tin-modified BRs.

In a preferred embodiment of the SPB-containing BR, in view of abrasion resistance and extrusion processability, SPB crystals are not merely dispersed in BR but are chemically bonded to BR and dispersed therein. The SPB preferably has a melting point of 180° C. to 220° C. The SPB content of the SPB-containing BR is preferably 2.5 to 20% by mass. The SPB content of the SPB-containing BR refers to the amount of boiling n-hexane insolubles.

In a preferred embodiment, the tin-modified BR is produced by polymerization of 1,3-butadiene using a lithium initiator followed by the addition of a tin compound, and the tin-modified BR further has a tin-carbon bond at a molecular chain end thereof.

Examples of the lithium initiator include lithium compounds such as alkyllithiums and aryllithiums. Examples of the tin compound include tin tetrachloride and butyltin trichloride. The tin-modified BR preferably has a tin atom content of 50 to 3,000 ppm. The tin-modified BR preferably has a molecular weight distribution (Mw/Mn) of 2 or less. The number average molecular weight (Mn) and weight average molecular weight (Mw) are measured using a gel permeation chromatograph (GPC) and calibrated with polystyrene standards. Moreover, the tin-modified BR preferably has a vinyl content of 5% to 50% by mass. The vinyl content (1,2-butadiene unit content) can be measured by infrared absorption spectrometry.

The amount of BR based on 100% by mass of the rubber component is preferably 20% by mass or more, more preferably 35% by mass or more. The amount is preferably 80% by mass or less, more preferably 75% by mass or less. When the amount of BR is within the range indicated above, good abrasion resistance, good durability, and good crack growth resistance can be obtained while ensuring good handling stability, good fuel economy, and good elongation at break.

For use in sidewalls or clinches, the combined amount of isoprene-based rubber and BR based on 100% by mass of the rubber component is preferably 90% by mass or more, more preferably 95% by mass or more, and may be 100% by mass. In this case, good handling stability, fuel economy, elongation at break, abrasion resistance, durability, and crack growth resistance can be obtained. For use in treads, BR or SBR may be contained as a main ingredient without NR.

The rubber composition for tires of the present invention includes a phenylenediamine antioxidant. The phenylenediamine antioxidant is located in the rubber outer surface layer of a tire and thereby serves to protect the rubber from ozone.

Examples of the phenylenediamine antioxidant include N-(1,3-dimethylbutyl)-N'-phenyl-p-phenylenediamine, N-(1,4-dimethylpentyl)-N'-phenyl-p-phenylenediamine, N-isopropyl-N'-phenyl-p-phenylenediamine, N,N'-diphenyl-p-phenylenediamine, N,N'-di-2-naphthyl-p-phenylenediamine, N-cyclohexyl-N'-phenyl-p-phenylenediamine, N,N'-bis(1-methylheptyl)-p-phenylenediamine, N,N'-bis(1,4-dimethylpentyl)-p-phenylenediamine, N,N'-bis(1-ethyl-3-methylpentyl)-p-phenylenediamine, N-4-methyl-2-pentyl-N'-phenyl-p-phenylenediamine, N,N'-diaryl-p-phenylenediamines, hindered diaryl-p-phenylenediamines, phenylhexyl-p-phenylenediamine, and phenyloctyl-p-phenylenediamine. Preferred among these is N-(1,3-dimethylbutyl)-N'-phenyl-p-phenylenediamine.

The amount of the phenylenediamine antioxidant per 100 parts by mass of the rubber component is 1.0 part by mass or more, preferably 1.5 parts by mass or more, more preferably 1.8 parts by mass or more. When the amount is less than 1.0 part by mass, sufficient ozone resistance or elongation at break is not obtained. Also, the amount is 10.0 parts by mass or less, preferably 8.0 parts by mass or less, more preferably 7.0 parts by mass or less, particularly preferably 6.0 parts by mass or less. When the amount exceeds 10.0 parts by mass, discoloration (brown discoloration) slightly occurs even if the amount of the surfactant is increased to 2.0 parts by mass or more.

The rubber composition for tires of the present invention may further contain a quinone antioxidant. The quinone antioxidant also blooms to the tire rubber surface and thereby serves to protect the rubber from ozone.

Examples of the quinone antioxidant include benzoquinone antioxidants, hydroquinone antioxidants, catechol antioxidants, quinonediimine antioxidants, quinomethane antioxidants, and quinodimethane antioxidants. Preferred among these are quinonediimine antioxidants.

Examples of the quinonediimine antioxidants include N-isopropyl-N'-phenyl-p-quinonediimine, N-(1,3-dimethylbutyl)-N'-phenylquinonediimine, N,N'-diphenyl-p-quinonediimine, N-cyclohexyl-N'-phenyl-p-quinonediimine, N-n-hexyl-N'-phenyl-p-quinonediimine, and N,N'-dioctyl-p-quinonediimine. Preferred among these is N-(1,3-dimethylbutyl)-N'-phenylquinonediimine (6QDI).

The rubber composition for tires of the present invention includes a masterbatch.

The masterbatch contains at least one nonionic surfactant selected from the group consisting of Pluronic type nonionic surfactants and nonionic surfactants represented by the above Formula (1) and/or Formula (2), and a silica. The nonionic surfactant in the form of such a masterbatch can be incorporated into the rubber composition for tires without using precision micro syringes. In addition, it can be introduced in the final kneading step, thereby resulting in greatly improved productivity.

$R^1$ in Formula (1) represents a C6-C26 hydrocarbon group. When $R^1$ is a hydrocarbon group having 5 or less carbon atoms, such a nonionic surfactant less permeates rubber and migrates to the rubber surface too fast, as a result of which the rubber surface tends to have poor appearance. Also, when $R^1$ is a hydrocarbon group having 27 or more carbon atoms, such a material is difficult to obtain or expensive and is thus unsuitable. When $R^1$ is a hydrocarbon group having a carbon number within the range indicated above, blooming of the nonionic surfactant can be suitably controlled, and the effects of the present invention can be more suitably achieved.

$R^1$ in Formula (1) is preferably a hydrocarbon group having 8 to 24 carbon atoms, more preferably 10 to 22 carbon atoms, still more preferably 14 to 20 carbon atoms.

Examples of the C6-C26 hydrocarbon group as $R^1$ in Formula (1) include C6-C26 alkenyl groups, C6-C26 alkynyl groups, and C6-C26 alkyl groups.

Examples of the C6-C26 alkenyl groups include 1-hexenyl, 2-hexenyl, 1-octenyl, decenyl, undecenyl, dodecenyl, tridecenyl, tetradecenyl, pentadecenyl, heptadecenyl, octadecenyl, icosenyl, tricosenyl, and hexacosenyl groups.

Examples of the C6-C26 alkynyl groups include hexynyl, heptynyl, octynyl, nonynyl, decynyl, undecynyl, dodecynyl, tridecynyl, tetradecynyl, pentadecynyl, heptadecynyl, octadecynyl, icosynyl, tricosynyl, and hexacosynyl groups.

Examples of the C6-C26 alkyl groups include hexyl, heptyl, 2-ethylhexyl, octyl, nonyl, decyl, undecyl, dodecyl, tridecyl, tetradecyl, pentadecyl, octadecyl, heptadecyl, octadecyl, icosyl, tricosyl, and hexacosyl groups.

$R^1$ in Formula (1) is preferably a C6-C26 alkenyl group or a C6-C26 alkynyl group, more preferably a C6-C26 alkenyl group.

A nonionic surfactant of Formula (1) with a greater d (integer) has a higher value of HLB, which shows hydrophile-lipophile balance, and tends to migrate faster to the rubber surface. In the present invention, the d value is not particularly limited, and may be chosen appropriately depending on the service conditions, purpose, or other factors. In particular, d is preferably 2 to 25, more preferably 4 to 20, still more preferably 8 to 16, particularly preferably 10 to 14.

Examples of the nonionic surfactant represented by Formula (1) include ethylene glycol monooleate, ethylene glycol monopalmeate, ethylene glycol monopalmitate, ethylene glycol monovaccenate, ethylene glycol monolinoleate, ethylene glycol monolinolenate, ethylene glycol monoarachidonate, ethylene glycol monostearate, ethylene glycol monocetylate, and ethylene glycol monolaurate. Each of these may be used alone, or two or more of these may be used in combination. In view of ready availability or cost, ethylene glycol monooleate, ethylene glycol monolaurate, ethylene glycol monostearate, and ethylene glycol monopalmitate are preferred among these.

$R^2$ and $R^3$ in Formula (2) are the same as or different from each other and each represent a C6-C26 hydrocarbon group. When $R^2$ or $R^3$ is a hydrocarbon group having 5 or less carbon atoms, such a nonionic surfactant less permeates rubber and migrates to the rubber surface too fast, as a result of which the rubber surface tends to have poor appearance. When $R^2$ or $R^3$ is a hydrocarbon group having 27 or more carbon atoms, such a material is difficult to obtain or expensive and is thus unsuitable. When $R^2$ and $R^3$ are each a hydrocarbon group having a carbon number within the range indicated above, blooming of the nonionic surfactant can be suitably controlled, and the effects of the present invention can be more suitably achieved.

$R^2$ and $R^3$ in Formula (2) are each preferably a hydrocarbon group having 8 to 24 carbon atoms, more preferably 10 to 22 carbon atoms, still more preferably 14 to 20 carbon atoms.

Examples of the C6-C26 hydrocarbon group as $R^2$ or $R^3$ in Formula (2) include C6-C26 alkenyl groups, C6-C26 alkynyl groups, and C6-C26 alkyl groups.

Examples of the C6-C26 alkenyl groups, C6-C26 alkynyl groups, and C6-C26 alkyl groups include those groups mentioned for $R^1$ above.

$R^2$ and $R^3$ in Formula (2) are each preferably a C6-C26 alkenyl group or a C6-C26 alkynyl group, more preferably a C6-C26 alkenyl group.

A nonionic surfactant of Formula (2) with a greater e (integer) has a higher value of HLB, which shows hydrophile-lipophile balance, and tends to migrate faster to the rubber surface. In the present invention, the e value is not particularly limited, and may be chosen appropriately depending on the service conditions, purpose, or other factors. In particular, e is preferably 2 to 25, more preferably 4 to 20, still more preferably 8 to 16, particularly preferably 10 to 14.

Examples of the nonionic surfactant represented by Formula (2) include ethylene glycol dioleate, ethylene glycol dipalmeate, ethylene glycol dipalmitate, ethylene glycol divaccenate, ethylene glycol dilinoleate, ethylene glycol dilinolenate, ethylene glycol diarachidonate, ethylene glycol distearate, ethylene glycol dicetylate, and ethylene glycol dilaurate. Each of these may be used alone, or two or more of these may be used in combination. In view of ready availability or cost, ethylene glycol dioleate, ethylene glycol dilaurate, ethylene glycol distearate, and ethylene glycol dipalmitate are preferred among these.

The Pluronic type nonionic surfactants are also called polyoxyethylene polyoxypropylene glycols, polyoxyethylene polyoxypropylene block polymers, or polypropylene glycol ethylene oxide adducts, and are generally represented by Formula (I) below. As shown in Formula (I), the Pluronic type nonionic surfactants contain on both sides thereof a hydrophilic group having an ethylene oxide structure, and also contain a hydrophobic group having a propylene oxide structure between the hydrophilic groups.

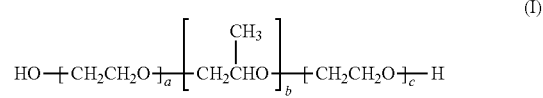
(I)

In Formula (I), a, b, and c each represent an integer.

The degree of polymerization of the polypropylene oxide block (b in Formula (I)) and the number of polyethylene oxide units added (a+c in Formula (I)) in the Pluronic type nonionic surfactant are not particularly limited, and may be chosen appropriately depending on the service conditions, purpose, or other factors. A surfactant with a higher proportion of the polypropylene oxide block tends to have higher affinity for rubber and thus to migrate to the rubber surface at a slower rate. In particular, in order to suitably control blooming of the nonionic surfactant and more suitably achieve the effects of the present invention, the degree of polymerization of the polypropylene oxide block (b in Formula (I)) is preferably 100 or less, more preferably 10 to 70, still more preferably 10 to 60, particularly preferably 20 to 60, most preferably 20 to 45. For the same reason, the number of polyethylene oxide units added (a+c in Formula (I)) is preferably 100 or less, more preferably 3 to 65, still more preferably 5 to 55, particularly preferably 5 to 40, most preferably 10 to 40. When the degree of polymerization of the polypropylene oxide block and the number of polyethylene oxide units added are within the respective ranges indicated above, blooming of the nonionic surfactant can be suitably controlled, and the effects of the present invention can be more suitably achieved.

Examples of the Pluronic type nonionic surfactants include Pluronic series available from BASF Japan Ltd., Newpol PE series available from Sanyo Chemical Industries, Ltd., Adeka Pluronic L or F series available from Adeka Corporation, Epan series available from DKS Co. Ltd., and Pronon series or UNILUB available from NOF corporation. Each of these may be used alone, or two or more of these may be used in combination.

Each of the nonionic surfactants described above may be used alone, or two or more of them may be used in combination.

In order to more suitably achieve the effects of the present invention, the nonionic surfactants represented by Formula (1) are preferred among the nonionic surfactants represented by Formula (1) and/or Formula (2).

The silica is not particularly limited, and may be dry silica (anhydrous silica), wet silica (hydrous silica), or other types of silica, but the silica has a BET value of 40 $m^2/g$ or more, preferably 45 $m^2/g$ or more, more preferably 110 $m^2/g$ or more. When the BET value is less than 40 $m^2/g$, a large amount of silica is needed for the nonionic surfactant to be adsorbed to prepare a masterbatch. The silica also has a BET value of 250 $m^2/g$ or less, preferably 240 $m^2/g$ or less, more preferably 200 $m^2/g$ or less. When the BET value is more than 250 $m^2/g$, such a silica has lower dispersibility in the rubber component, so that a long kneading time is necessary when the silica is introduced in the final kneading step.

As to the silica, there are two powder appearances, Gr (granule) and MP (micropearl, fine powder). They have the same performance with each other.

Herein, the BET value of silica is determined in accordance with JIS K 6430:2008.

The ratio between the nonionic surfactant and the silica in the masterbatch is preferably 1:5 to 1:0.15 by mass (if the masterbatch consists only of the nonionic surfactant and the silica, the nonionic surfactant content is 16.7% to 87.0% by mass), more preferably 1:1.5 to 1:0.2 by mass (if the masterbatch consists only of the nonionic surfactant and the silica, the nonionic surfactant content is 40.0% to 83.0% by mass), depending on the viscosity of the nonionic surfactant or the liquid absorption capacity of the silica. When the ratio is within the range indicated above, a masterbatch which is powder or a viscous solid at room temperature can be formed, and it is also advantageous in terms of fluidity and dispersibility of the nonionic surfactant and the silica in the rubber composition for tires.

The masterbatch may further contain solid additives other than silica, such as wax, an antioxidant, a tackifier, or zinc oxide.

The masterbatch can be prepared for example by placing the nonionic surfactant, silica, and other optional solid additives in a vessel, and stirring them with blades at room temperature (23° C.) or with heating depending on the type of nonionic surfactant. During the preparation, the entire components are uniformly mixed so that no large solid mass is formed locally. It is sufficient to form crumbs of uniform particle size with an average particle size of about several millimeters.

In the final kneading step, the masterbatch can be automatically weighed using a final weighing instrument and then combined into the same measuring cylinder as the vulcanizing agent to introduce them into a Banbury mixer at once, thereby achieving high productivity.

The nonionic surfactant adsorbed to the silica in the masterbatch is expected to separate from the silica during the final kneading step and readily uniformly disperse into the rubber composition for tires. After vulcanization, the nonionic surfactant blooms little by little with time (over about three years) and dissolves the antioxidant and the like to flatten the surface-protecting layer.

The masterbatch is formulated so that the combined amount of the nonionic surfactant represented by Formula (1), the nonionic surfactant represented by Formula (2), and the Pluronic type nonionic surfactant (the nonionic surfactant amount) is 0.1 parts by mass or more, preferably 0.3 parts by mass or more, more preferably 0.5 parts by mass or more, still more preferably 1 part by mass or more, particularly preferably 1.2 parts by mass or more, per 100 parts by mass of the rubber component. When the nonionic surfactant amount is less than 0.1 parts by mass, the effects of the present invention are not sufficiently achieved. The masterbatch is also formulated so that the nonionic surfactant amount is 5.0 parts by mass or less, preferably 4.0 parts by mass or less, more preferably 3.0 parts by mass or less, still more preferably 2.5 parts by mass or less, per 100 parts by mass of the rubber component. When the nonionic surfactant amount is more than 5.0 parts by mass, elongation at break or productivity deteriorates.

The rubber composition for tires of the present invention preferably contains wax. The wax also blooms to the tire rubber surface and thereby serves to protect the rubber from ozone. The wax may be a petroleum-based wax or naturally-occurring wax but is preferably a petroleum-based wax as it provides excellent ozone resistance over a wide temperature range.

The petroleum-based wax may be any wax derived from petroleum resources, including, for example, paraffin wax and microcrystalline wax. In particular, the petroleum-based wax preferably contains C20 to C32 normal alkanes to achieve excellent ozone resistance over a wide temperature range. The petroleum-based wax may be used alone or in combinations of two or more.

The petroleum-based wax containing C20 to C32 normal alkanes is not particularly limited, and may be, for example, a petroleum-based wax containing a predetermined amount of C20 to C55 normal alkanes. In particular, in order to achieve excellent ozone resistance, the petroleum-based wax may suitably have a normal alkane content of 70% by mass or more, more suitably 80% by mass or more.

The petroleum-based wax preferably contains a total of 25% by mass or more, more preferably 35% by mass or more of C20 to C32 normal alkanes based on 100% by mass of the petroleum-based wax. When the total amount is less than 25% by mass, sufficient ozone resistance may not be obtained in a temperature range of 20° C. or lower. The total amount is preferably 90% by mass or less, more preferably 50% by mass or less. When the total amount is more than 90% by mass, discoloration resistance may be reduced.

The petroleum-based wax preferably contains a total of 25% by mass or more, more preferably 35% by mass or more of C33 to C44 normal alkanes based on 100% by mass of the petroleum-based wax. When the total amount is less than 25% by mass, sufficient ozone resistance may not be obtained in a temperature range of about 40-50° C. The total amount is preferably 90% by mass or less, more preferably 50% by mass or less. When the total amount is more than 90% by mass, a large amount of C33 to C44 normal alkanes tend to bloom in a temperature range of about 40-50° C., thereby causing white discoloration.

The petroleum-based wax preferably contains a total of 0.5% by mass or more, more preferably 2% by mass or more of C45 to C47 normal alkanes based on 100% by mass of the petroleum-based wax. When the total amount is less than 0.5% by mass, cracking resistance may slightly deteriorate in a temperature range of about 60° C. The total amount is preferably 10% by mass or less, more preferably 5% by mass or less. When the total amount is more than 10% by mass, resistance to discoloration (white discoloration) tends to deteriorate in a temperature range of about 60° C.

The petroleum-based wax preferably contains a total of 10% by mass or less, more preferably 5% by mass or less of C48 and higher normal alkanes based on 100% by mass of the petroleum-based wax. In such case, good resistance to discoloration (white discoloration) can be obtained in a temperature range of 60° C. or higher.

When a petroleum-based wax is incorporated, the amount of petroleum-based wax per 100 parts by mass of the rubber component is preferably 0.3 parts by mass or more, more preferably 1.0 part by mass or more. When the amount is less than 0.3 parts by mass, particular effects such as improved ozone resistance may not be observed. Also, the amount is 6.0 parts by mass or less, preferably 4.0 parts by mass or less, more preferably 2.5 parts by mass or less. When the amount is more than 6.0 parts by mass, too large an amount of blooms may occur, resulting in white discoloration on the tire or reduced elongation at break.

The rubber composition for tires of the present invention preferably contains carbon black. This produces a reinforcing effect and an UV-blocking effect, and therefore the effects of the present invention can be better achieved.

Examples of usable carbon blacks include GPF, FEF, HAF, ISAF, and SAF.

The carbon black preferably has a nitrogen adsorption specific surface area ($N_2SA$) of 20 to 200 $m^2$/g, more preferably 30 to 60 $m^2$/g. When the $N_2SA$ is less than 20 $m^2$/g, durability or handling stability may be reduced. When the $N_2SA$ is more than 200 $m^2$/g, sufficient fuel economy or processability may not be obtained.

Herein, the nitrogen adsorption specific surface area of carbon black can be determined in conformity with JIS K 6217-2:2001.

When the rubber composition for tires of the present invention contains carbon black, the amount of carbon black per 100 parts by mass of the rubber component is preferably 2 to 70 parts by mass, more preferably 5 to 60 parts by mass. When the amount is less than 2 parts by mass, sufficient UV resistance or reinforcing properties tend not to be obtained, and as a result durability, elongation at break, or handling stability tends to deteriorate. When the amount is more than 70 parts by mass, crack growth resistance or fuel economy may deteriorate.

The rubber composition containing a large amount of carbon black can also achieve good processability as well as the effects described above. For example, the rubber composition containing 46 parts by mass or more, preferably 50 parts by mass or more of carbon black per 100 parts by mass of the rubber component can also achieve the effects of the present invention. In this case, the upper limit of the amount is not particularly limited, but in view of fuel economy and other properties, it is preferably 120 parts by mass or less, more preferably 90 parts by mass or less, still more preferably 70 parts by mass or less.

In addition to the silica used in the masterbatch, the rubber composition for tires of the present invention may further contain silica. Any type of silica may be used, including, for example, dry silica (anhydrous silica) and wet silica (hydrous silica). Preferred is wet silica (hydrous silica) because it has a large number of silanol groups.

When the rubber composition for tires of the present invention contains additional silica in addition to the silica used in the masterbatch, the amount of the additional silica may be selected appropriately in view of the effects of the present invention and other factors. For example, for use in sidewalls or clinches, the total amount of the silica used in the masterbatch and the additional silica is preferably 5 parts by mass or more, more preferably 10 parts by mass or more per 100 parts by mass of the rubber component. When the total amount is less than 5 parts by mass, sufficient elongation at break is not obtained and durability is not improved. The total amount of silica is preferably 40 parts by mass or less, more preferably 30 parts by mass or less. When the total amount is more than 40 parts by mass, abrasion resistance (rim chafing resistance, resistance to curb scuffing) or fuel economy may deteriorate.

Preferably, the rubber composition for tires of the present invention further contains a silane coupling agent in an amount of approximately 1 to 20% by mass relative to the silica. The combined use of a silane coupling agent prevents reaggregation of silica.

The silane coupling agent may be any silane coupling agent conventionally used in combination with silica in the rubber industry. Examples include bis(3-triethoxysilylpropyl)tetrasulfide, bis(2-triethoxysilylethyl)tetrasulfide, bis(3-triethoxysilylpropyl)trisulfide, bis(2-triethoxysilylethyl)trisulfide, bis(3-triethoxysilylpropyl)disulfide, bis(2-triethoxysilylethyl)disulfide, and other sulfide vulcanization accelerators. Among these, bis(3-triethoxysilylpropyl)disulfide is preferred because it is inexpensive and easy to obtain. Each of these silane coupling agents may be used alone, or two or more of these may be used in combination.

When carbon black and silica are used in combination, however, no silane coupling agent is particularly necessary if the amount of carbon black is 20 parts by mass or more and the amount of silica is 10 parts by mass or less, because in such case the silica is immobilized in the carbon black gel and is thus less likely to reaggregate.

The rubber composition for tires of the present invention may further contain a softener. The inclusion of a softener can improve extrudability and adhesion, and can also suitably control blooming of the above-mentioned antioxidant, nonionic surfactant, and wax, so that the effects of the present invention can be better achieved.

Examples of the softener include process oils, and resins such as C5 petroleum resins, C9 petroleum resins, coumarone indene resins, indene resins, non-reactive alkylphenol resins, and aromatic vinyl polymers obtained by polymerization of α-methylstyrene and/or styrene. The softener may be selected appropriately in view of the migration rate of the wax or antioxidant, and other factors. In order to suitably achieve the effects of the present invention, process oils or C5 petroleum resins are preferred for sidewall or clinch formulations.

Examples of the oils include process oils, vegetable oils and fats, and mixtures thereof. Examples of the process oils include paraffinic process oils, aromatic process oils, and naphthenic process oils. Specific examples of the paraffinic process oils include PW-32, PW-90, PW-150, and PS-32 all available from Idemitsu Kosan Co., Ltd. Specific examples of the aromatic process oils include AC-12, AC-460, AH-16, AH-24, and AH-58 all available from Idemitsu Kosan Co., Ltd. Examples of the vegetable oils and fats include castor oil, cottonseed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, and tung oil. Each of these may be used alone, or two or more of these may be used in combination. In order to suitably achieve the effects of the present invention, aromatic process oils are especially preferred.

When the rubber composition for tires contains a softener, the amount of softener per 100 parts by mass of the rubber component is preferably 1.0 part by mass or more, more preferably 3.0 parts by mass or more. The amount of softener is also preferably 40 parts by mass or less, more preferably 30 parts by mass or less, still more preferably 14 parts by mass or less, particularly preferably 12 parts by mass or less. When the softener, which itself blooms to the tire surface, is used in the range indicated above, blooming of the above-mentioned antioxidant, nonionic surfactant, and wax can be suitably controlled, and the effects of the present invention can be more suitably achieved. However, when 14 parts by mass or more of a process oil is incorporated for sidewalls, the rubber may become hard due to evaporation of the oil during service, as a result of which cracks may easily occur and tensile strength may decrease.

In addition to the above-mentioned components, the rubber composition for tires of the present invention may appropriately incorporate compounding agents commonly used in the preparation of rubber compositions, such as stearic acid, zinc oxide, and vulcanizing agents.

The rubber composition containing a large amount of stearic acid can also achieve good processability as well as the effects described above. For example, the rubber composition containing 2.2 to 4.0 parts by mass, preferably 2.5 to 3.0 parts by mass of stearic acid per 100 parts by mass of the rubber component can also achieve the effects of the present invention. In this case, good rubber lubricity and good cure rate can be obtained, and the desired effects can be achieved.

In the present invention, sulfur is preferably used as a vulcanizing agent. This can lead to moderate crosslinking between polymers, with the result that blooming of the antioxidant, nonionic surfactant, and wax can be suitably controlled, and the effects of the present invention can be more suitably achieved. Examples of the sulfur include those commonly used in the rubber industry, such as powdered sulfur, precipitated sulfur, colloidal sulfur, insoluble sulfur, highly dispersible sulfur, and soluble sulfur. Each of these may be used alone, or two or more of these may be used in combination.

The amount of sulfur per 100 parts by mass of the rubber component is preferably 0.1 parts by mass or more, more preferably 0.5 parts by mass or more. For sidewall or clinch formulations, the amount is preferably 1.2 parts by mass or more, while for tread formulations, the amount is preferably 0.6 parts by mass or more. When the amount is less than 0.1 parts by mass, sufficient vulcanizate hardness (Hs) or sufficient co-curing with neighboring rubber compounds may not be obtained. The amount of sulfur is preferably 6.0 parts by mass or less, more preferably 5.0 parts by mass or less, still more preferably 4.0 parts by mass or less, particularly preferably 3.0 parts by mass or less. When the amount is more than 6.0 parts by mass, crack growth resistance, ozone resistance, elongation at break, or durability may deteriorate.

In addition to sulfur, alkylphenol-sulfur chloride condensates (e.g. Tackirol V200 available from Taoka Chemical Co., Ltd.) may be used as vulcanizing agents in the present invention.

The rubber composition of the present invention may be prepared by, for example, a method that includes a base kneading step including mixing and kneading a rubber component and a phenylenediamine antioxidant, and a final kneading step including adding a vulcanizing agent and a masterbatch to the mixture obtained in the base kneading step and kneading them. Since the masterbatch is introduced in the final kneading step as described above, the kneading efficiency in the base kneading step is not impaired, and high overall productivity can be achieved.

In the base kneading step, the rubber component, the phenylenediamine antioxidant, and other components excluding vulcanizing agents and the masterbatch, such as a quinone antioxidant, wax, carbon black, additional silica to be added in addition to the silica used in the masterbatch, a silane coupling agent, a softener, stearic acid, and/or zinc oxide, are introduced and kneaded.

In the final kneading step, for example, the masterbatch is automatically weighed using a final weighing instrument and then combined into the same measuring cylinder as the vulcanizing agent to introduce them into a kneading machine at once.

In the base kneading step and final kneading step, kneading may be carried out with conventionally known kneading machines such as Banbury mixers, kneaders, and open roll mills.

[Rubber Composition for Tires of the Second Aspect of the Present Invention]

The rubber composition for tires of the second aspect of the present invention includes predetermined amounts of a rubber component containing a diene rubber, a phenylenediamine antioxidant, at least one nonionic surfactant selected from the group consisting of Pluronic type nonionic surfactants and nonionic surfactants represented by the above Formula (1) and/or Formula (2), carbon black, silica, stearic acid, and a vulcanization accelerator represented by the above Formula (3).

Like the first aspect of the present invention, since the rubber composition of the second aspect of the present invention includes a diene rubber, a phenylenediamine antioxidant, and a specific nonionic surfactant, discoloration can be reduced, and the effects of improving blackening and ozone resistance can be obtained. Furthermore, due to the incorporation of a specific vulcanization accelerator, scorch or compound scorch can be suppressed despite high carbon black and stearic acid contents, resulting in good processability.

The rubber component may suitably be as described in the first aspect of the present invention. The amounts of diene rubber, isoprene-based rubber, and BR are also preferably as described above. For use in sidewalls or clinches, the amount of isoprene-based rubber and the combined amount of isoprene-based rubber and BR are also preferably as described above.

The phenylenediamine antioxidant may suitably be as described in the first aspect of the present invention. The amount of the phenylenediamine antioxidant is also preferably as described above. The above-described quinone antioxidant may further be incorporated as described above.

The at least one nonionic surfactant selected from the group consisting of Pluronic type nonionic surfactants and nonionic surfactants represented by the above Formula (1) and/or Formula (2) may suitably be as described in the first aspect of the present invention.

The combined amount of the nonionic surfactant represented by Formula (1), the nonionic surfactant represented by Formula (2), and the Pluronic type nonionic surfactant (the nonionic surfactant amount) is 0.1 parts by mass or more, preferably 0.3 parts by mass or more, more preferably 0.5 parts by mass or more, still more preferably 1 part by mass or more, particularly preferably 1.2 parts by mass or more per 100 parts by mass of the rubber component. When the combined amount is less than 0.1 parts by mass, the effects of the present invention are not sufficiently obtained. Also, the combined amount is 5.0 parts by mass or less, preferably 4.0 parts by mass or less, more preferably 3.0 parts by mass or less, still more preferably 2.5 parts by mass or less. When the combined amount is more than 5.0 parts by mass, elongation at break or productivity deteriorates.

The carbon black may suitably be as described in the first aspect of the present invention.

In view of abrasion resistance and fuel economy, the amount of carbon black per 100 parts by mass of the rubber component is 46 parts by mass or more, preferably 50 parts by mass or more. The upper limit of the amount is not particularly limited, but in view of fuel economy and other properties, it is preferably 120 parts by mass or less, more preferably 90 parts by mass or less, still more preferably 70 parts by mass or less.

The silica may suitably be as described in the first aspect of the present invention.

In view of abrasion resistance and fuel economy, the amount of silica per 100 parts by mass of the rubber component is 15 parts by mass or less, preferably 10 parts by mass or less. The lower limit of the amount is not particularly limited, and the rubber composition may contain no silica.

The amount of stearic acid per 100 parts by mass of the rubber component is 2.2 parts by mass or more, preferably 2.5 parts by mass or more. The amount is 4.0 parts by mass or less, preferably 3.0 parts by mass or less. When the amount is within the range indicated above, good rubber lubricity and good cure rate can be obtained, and the desired effects can be achieved.

A compound represented by Formula (3) below is used as a specific vulcanization accelerator in the present invention.

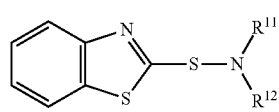

(3)

In the formula, $R^{11}$ represents a C2-C16 alkyl group, and $R^{12}$ represents a C3-C16 branched alkyl group or a benzothiazolylsulfide group.

The alkyl group as $R^{11}$ is preferably a branched alkyl group. The branched alkyl group is preferably as described for the C3-C16 branched alkyl group as $R^{12}$ which will be described later.

The alkyl group as $R^{11}$ preferably has 4 to 16 carbon atoms, more preferably 4 to 12 carbon atoms. When the carbon number is 1, adsorption tends to occur, while when the carbon number is 17 or more, hardness tends to decrease.

Preferred examples of the alkyl group as $R^{11}$ include an ethyl group, a t-butyl group, a 2-ethylhexyl group, a 2-methylhexyl group, a 3-ethylhexyl group, a 3-methylhexyl group, a 2-ethylpropyl group, a 2-ethylbutyl group, a 2-ethylpentyl group, a 2-ethylheptyl group, and a 2-ethyloctyl group.

The C3-C16 branched alkyl group as $R^{12}$ is preferably a branched alkyl group (linear branched alkyl group) in which at least one hydrogen atom in the carbon chain $(CH_2)_k$ of the linear alkyl group represented by $—(CH_2)_k—CH_3$ where k is an integer of 1 to 14 is replaced with an alkyl group.

The branched alkyl group as $R^{12}$ preferably has 4 to 16 carbon atoms, more preferably 6 to 12 carbon atoms. When the carbon number is 2 or less, adsorption tends to occur, while when the carbon number is 17 or more, hardness tends to decrease.

Preferred examples of the alkyl group as $R^{12}$ include a t-butyl group, a 2-ethylhexyl group, a 2-methylhexyl group, a 3-ethylhexyl group, a 3-methylhexyl group, a 2-ethylpropyl group, a 2-ethylbutyl group, a 2-ethylpentyl group, a 2-ethylheptyl group, and a 2-ethyloctyl group.

The benzothiazolylsulfide group as $R^{12}$ is represented by the following formula:

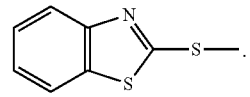

$R^{12}$ is preferably a benzothiazolylsulfide group. In order to obtain excellent hardness, $R^{12}$ is preferably a benzothiazolylsulfide group when $R^{11}$ is a t-butyl group.

Examples of the compound represented by Formula (3) include BEHZ (N,N-di(2-ethylhexyl)-2-benzothiazolylsulfenamide) available from Kawaguchi Chemical Industry Co., Ltd., BMHZ (N,N-di(2-methylhexyl)-2-benzothiazolylsulfenamide) available from Kawaguchi Chemical Industry Co., Ltd., Santocure TBSI (N-tert-butyl-2-benzothiazolylsulfenimide) available from Flexsys, and ETZ (N-ethyl-N-t-butylbenzothiazole-2-sulfenamide) available from Ouchi Shinko Chemical Industrial Co., Ltd.

The amount of the vulcanization accelerator represented by Formula (3) per 100 parts by mass of the rubber component is preferably 0.5 parts by mass or more, more preferably 0.7 parts by mass or more. The amount is preferably 5.0 parts by mass or less, more preferably 3.0 parts by mass or less. When the amount is within the range indicated above, the effects of the present invention can be more suitably achieved.

The rubber composition according to the second aspect of the present invention may also incorporate the above-described silane coupling agent, wax, and softener, preferably in amounts as stated above. In addition to the above components, the rubber composition may appropriately incorporate the compounding agents commonly used in the preparation of rubber compositions as described earlier.

In the present invention, sulfur is preferably used as a vulcanizing agent. The vulcanizing agent may suitably be as described in the first aspect of the present invention. The amount of sulfur is also preferably as described above. As described above, in addition to sulfur, alkylphenol-sulfur chloride condensates may also be used.

The rubber composition of the second aspect of the present invention can be prepared by conventional methods. Specifically, for example, the components are kneaded with a Banbury mixer, a kneader, an open roll mill, or other devices, and the kneaded mixture is vulcanized, whereby a rubber composition can be produced.

In view of suppression of discoloration and other purposes, the rubber compositions of the first and second aspects of the present invention preferably contain N-(cyclohexylthio)phthalimide (vulcanization retarder) in an amount of 0.25 parts by mass or less, more preferably 0.20 parts by mass or less per 100 parts by mass of the rubber component, or may not contain it.

[Tire Components]

The rubber compositions for tires of the first and second aspects of the present invention can be used in any tire component. They can be suitably used in tire outer layers forming the surface (outer surface) of tires, such as treads, wings, sidewalls, and clinches.

The term "wing" refers to a component positioned between the tread and the sidewall in the shoulder area.

Specifically, it is a component as shown in, for example, FIGS. 1 and 3 of JP 2007-176267 A.

The term "clinch" refers to a rubber portion located in the lower part of the sidewall and covering the area contacting the rim, and is also called a clinch apex or a rubber chafer. Specifically, it is a component as shown in, for example, FIG. 1 of JP 2008-75066 A.

[Pneumatic Tires]

The pneumatic tires of the present invention can be formed from the rubber compositions for tires of the present invention by usual methods. Specifically, the rubber composition for tires of the present invention before vulcanization is extruded into the shape of a tire component such as a tread, a wing, a sidewall, or a clinch and then formed in a usual manner on a tire building machine and assembled with other tire components to build an unvulcanized tire. The unvulcanized tire is heated under pressure in a vulcanizer, whereby a tire can be produced.

EXAMPLES

The present invention will be specifically described with reference to, but not limited to, examples.

<Preparation of Masterbatch>

A surfactant and powders such as silica in the formulation amounts shown in Table 1 were placed in a 150-L vessel. They were mixed with a stirring motor with blades at a rotational speed of 50 rpm at room temperature (23° C.) for about 10 minutes in a manner that the entire components were uniformly mixed so that no large solid mass was formed locally. As a result, crumbs of uniform particle size with an average particle size of about several millimeters were formed. The masterbatch thus obtained was in the form of powder at room temperature (23° C.).

The chemicals shown in Table 1 are collectively described below.

(Surfactant)

NEWPOL PE-64 (Pluronic type nonionic surfactant, copolymer of PEG/PPG (25/30), represented by the above Formula (I) in which a+c is 25 and b is 30) available from Sanyo Chemical Industries, Ltd.

NEWPOL PE-74 (Pluronic type nonionic surfactant, copolymer of PEG/PPG (30/35), represented by the above Formula (I) in which a+c is 30 and b is 35) available from Sanyo Chemical Industries, Ltd.

Ionet DO600 (main ingredient: a compound represented by Formula (2) in which $R^2$ and $R^3$ are each $-C_{17}H_{33}$, and e is 12 (the following formula)) available from Sanyo Chemical Industries, Ltd.

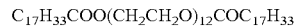

Ionet PO600 (main ingredient: a compound represented by Formula (1) in which $R^1$ is $-C_{17}H_{33}$, and d is 12 (the following formula)) available from Sanyo Chemical Industries, Ltd.

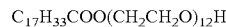

Polyoxyethylene sorbitan monostearate available from Kanto Chemical Co., Inc.

(Silica)

ULTRASIL VN3Gr (BET value: 175 m²/g) available from Evonik Degussa

ULTRASIL U9000Gr (BET value: 220 m²/g) available from Evonik Degussa

ULTRASIL U360Gr (BET value: 50 m²/g) available from Evonik Degussa

Zeosil 1165MP (BET value: 160 m²/g) available from Rhodia (Carbon Black)

SHOBLACK N550 (BET value: 42 m²/g) available from Cabot Japan K.K.

SHOBLACK N220 (BET value: 111 m²/g) available from Cabot Japan K.K.

SHOBLACK N134 (BET value: 143 m²/g) available from Cabot Japan K.K.

(Other Components)

Antigene 6C (N-(1,3-dimethylbutyl)-N'-phenyl-p-phenylenediamine (6PPD)) available from Sumitomo Chemical Co., Ltd. as antioxidant Marukarez T-100AS available from Maruzen Petrochemical Co., Ltd. as softener Ginrei R available from Toho Zinc Co., Ltd. as zinc oxide

TABLE 1

|  | Nonionic surfactant | | Silica or Carbon black | | Other components | |
|---|---|---|---|---|---|---|
|  | Type | Amount (% by mass) | Type | Amount (% by mass) | Type | Amount (% by mass) |
| Masterbatch 1-1 | Newpol PE64 | 50 | Silica VN3Gr (BET value: 175) | 50 | — | — |
| Masterbatch 1-2 | Newpol PE64 | 30 | Silica VN3Gr (BET value: 175) | 70 | — | — |
| Masterbatch 1-3 | Newpol PE64 | 75 | Silica VN3Gr (BET value: 175) | 25 | — | — |
| Masterbatch 1-4 | Newpol PE64 | 85 | Silica U9000Gr (BET value: 220) | 15 | — | — |
| Masterbatch 1-5 | Newpol PE64 | 20 | Silica VN3Gr (BET value: 175) | 80 | — | — |
| Masterbatch 1-6 | Newpol PE64 | 50 | Silica U360Gr (BET value: 50) | 50 | — | — |
| Masterbatch 1-7 | Newpol PE64 | 50 | Silica U9000Gr (BET value: 220) | 50 | — | — |
| Masterbatch 1-8 | Newpol PE64 | 15 | Silica VN3Gr (BET value: 175) | 85 | — | — |
| Masterbatch 1-9 | Newpol PE64 | 90 | Silica U9000Gr (BET value: 220) | 10 | — | — |
| Masterbatch 1-10 | Newpol PE64 | 50 | Carbon black N550 (BET value: 42) | 50 | — | — |
| Masterbatch 1-11 | Newpol PE64 | 50 | Carbon black N220 (BET value: 111) | 50 | — | — |
| Masterbatch 1-12 | Newpol PE64 | 50 | Carbon black N134 (BET value: 143) | 50 | — | — |
| Masterbatch 1-13 | Newpol PE64 | 25 | Silica VN3Gr (BET value: 175) | 25 | Antigene 6C | 50 |
| Masterbatch 1-14 | Newpol PE64 | 25 | Silica VN3Gr (BET value: 175) | 25 | Marukarez T-100AS | 50 |
| Masterbatch 1-15 | Newpol PE64 | 25 | Silica VN3Gr (BET value: 175) | 25 | Zinc oxide | 50 |
| Masterbatch 1-16 | Newpol PE64 | 50 | Silica 1165MP (BET value: 160) | 50 | — | — |
| Masterbatch 1-17 | Newpol PE64 | 50 | Silica VN3Gr (BET value: 175) | 25 | Zinc oxide | 25 |
| Masterbatch 2-1 | Newpol PE74 | 50 | Silica VN3Gr (BET value: 175) | 50 | — | — |
| Masterbatch 2-2 | Newpol PE74 | 30 | Silica VN3Gr (BET value: 175) | 70 | — | — |
| Masterbatch 3-1 | Ionet DO600 | 50 | Silica VN3Gr (BET value: 175) | 50 | — | — |
| Masterbatch 4-1 | Ionet PO600 | 50 | Silica VN3Gr (BET value: 175) | 50 | — | — |

TABLE 1-continued

| | Nonionic surfactant | | Silica or Carbon black | | Other components | |
|---|---|---|---|---|---|---|
| | Type | Amount (% by mass) | Type | Amount (% by mass) | Type | Amount (% by mass) |
| Masterbatch 5-1 | Polyoxyethylene sorbitan monostearate | 50 | Silica VN3Gr (BET value: 175) | 50 | — | — |

Examples 1-1 to 1-21, Comparative Examples 1-1 to 1-16

The chemicals used in the examples and comparative examples are collectively listed below.
(Rubber Component)
  TSR20 as natural rubber
  IR2200 as synthetic polyisoprene rubber
  BR1250H (tin-modified BR polymerized using a lithium initiator, vinyl content: 10% to 13% by mass, Mw/Mn: 1.5, tin atom content: 250 ppm) available from Zeon Corporation as polybutadiene rubber
  VCR617 (SPB-containing BR, SPB content: 17% by mass, melting point of SPB: 200° C.) available from Ube Industries, Ltd. as polybutadiene rubber
  BUNA-CB29 MES (rare earth-catalyzed BR synthesized using a Nd catalyst, containing 37.5 parts by mass of MES per 100 parts by mass of the rubber component) available from Lanxess as polybutadiene rubber
(Carbon Black)
  SHOBLACK N550 (BET value: 42 $m^2/g$) available from Cabot Japan K.K.
  SHOBLACK N220 (BET value: 111 $m^2/g$) available from Cabot Japan K.K.
(Oil)
  Vivatec 500 (TDAE, low polycyclic aroma oil) available from H & R
(Tackifier)
  Marukarez T-100AS available from Maruzen Petrochemical Co., Ltd.
(Petroleum-Based Wax)
  Trial product (petroleum-based wax, normal alkane content: 85% by mass on average)
(Surfactant)
  NEWPOL PE-64 (Pluronic type nonionic surfactant, copolymer of PEG/PPG (25/30), represented by the above Formula (I) in which a+c is 25 and b is 30) available from Sanyo Chemical Industries, Ltd.
  NEWPOL PE-74 (Pluronic type nonionic surfactant, copolymer of PEG/PPG (30/35), represented by the above Formula (I) in which a+c is 30 and b is 35) available from Sanyo Chemical Industries, Ltd.
  Ionet DO600 (main ingredient: a compound represented by Formula (2) in which $R^2$ and $R^3$ are each —$C_{17}H_{33}$, and e is 12) available from Sanyo Chemical Industries, Ltd.
  Ionet PO600 (main ingredient: a compound represented by Formula (1) in which $R^1$ is —$C_{17}H_{33}$, and d is 12) available from Sanyo Chemical Industries, Ltd.
  Polyoxyethylene sorbitan monostearate available from Kanto Chemical Co., Inc.
(Antioxidant)
  Antigene 6C (N-(1,3-dimethylbutyl)-N'-phenyl-p-phenylenediamine (6PPD)) available from Sumitomo Chemical Co., Ltd.
  TMQ (poly(2,2,4-trimethyl-1,2-dihydroquinoline)) available from Ouchi Shinko Chemical Industrial Co., Ltd.
(Stearic Acid)
  Stearic acid "TSUBAKI" available from NOF Corporation
(Sulfur)
  Seimi sulfur OT (insoluble sulfur containing 10% oil) available from Nippon Kanryu Industry Co., Ltd.
(Vulcanization Accelerator)
  NOCCELER NS (N-tert-butyl-2-benzothiazolyl sulfenamide)(TBBS) available from Ouchi Shinko Chemical Industrial Co., Ltd.
(Zinc Oxide)
  Ginrei R available from Toho Zinc Co., Ltd.

The carbon number distribution of the petroleum-based wax was determined by the method described below. Table 4 shows the results.

The carbon number distribution was determined using a capillary GC analyzer, a capillary column coated with aluminum, and helium carrier gas at a flow rate of 4 mL/min, a column temperature of 180° C. to 390° C., and a rate of temperature rise of 15° C./min.

<Production of Test Tires>

The base kneading step was carried out by kneading the materials in the formulation amounts shown in Table 2 or 3, except the sulfur and vulcanization accelerator, in a 1.7-L Banbury mixer (Kobe Steel, Ltd.) for 5 minutes until the discharge temperature reached 170° C. to obtain a primary kneaded mixture. The sulfur and vulcanization accelerator were added to the primary kneaded mixture, and they were kneaded using an open two-roll mill for 4 minutes until the temperature reached 105° C. to obtain an unvulcanized rubber composition for tires (final kneading step). Here, the masterbatches shown in Tables 2 and 3 were introduced in either the base kneading step ("B" in the tables) or the final kneading step ("F" in the tables).

The unvulcanized rubber compositions for tires thus obtained were formed into the shape of a tread, a wing, a sidewall, and a clinch and assembled with other tire components to build unvulcanized tires. The unvulcanized tires were vulcanized at 170° C. to prepare test tires (205/65R15). The performance of the test tires was evaluated in the following tests.

Tables 2 and 3 show the results.
(Hardness Measurement)

Rubber samples were cut out of the sidewalls of the tires. Next, the hardness of the rubber samples was measured at 25° C. using a durometer in conformity with JIS K 6253 (Shore A measurement). The formulations of the samples were adjusted to a hardness of 55±1 in order to permit a comparison of elongation at break (EB) between the samples.

(Productivity)

Productivity was evaluated in terms of both kneading time and chemical measurability. Specifically, a productivity score was calculated by subtracting a score based on chemical measurability determined by a demerit system, from a score based on kneading time obtained as follows. The target score was 110 or higher.

(A) Evaluation Based on Kneading Time

First, the kneading time required until the accumulated power consumption reached to a point corresponding to a predetermined solid chemical dispersion value and a predetermined vulcanizate property value was measured in both the base kneading step and the final kneading step. The total of the measured base kneading time and final kneading time was calculated. For example, if the base kneading time is 3.0 minutes and the final kneading time is 1.5 minutes, the total kneading time is 4.5 minutes. A shorter total kneading time is considered to indicate a higher productivity. In order to calculate scores based on kneading time, the total kneading times of the examples and comparative examples were expressed as an index, with the total kneading time of Comparative Example 1, in which no surfactant was incorporated, being set equal to 100.

Since it is a technical common sense to control the rubber temperature within a range where compound scorch is prevented, the power could be considered to be consumed to disperse the filler, oil, and solid chemicals in the rubber component in the Banbury mixer. In the case of sidewall formulations, the discharge temperature is usually set to 160° C. in the base kneading step and to 105° C. in the final kneading step.

(B) Evaluation Based on Chemical Measurability

An evaluation was made on whether certain chemicals from the respective chemical tanks had appropriate fluidity to flow through the passages and were introduced into the intermediate chemical weighing instruments or the Banbury mixer accurately with only small variations.

The evaluation results were scored by a demerit system using the following criteria: 0: A predetermined amount of the chemical could be weighed in the chemical weighing instrument with only small lot-to-lot variations, and also had appropriate fluidity to flow through the passage to the Banbury mixer; −10: The chemical was viscous and did not flow smoothly even when it was tilted; −25: The chemical was so viscous that it hardly flowed but adhered to the chemical weighing instrument (the score of −25 is the maximum demerit).

In the examples and comparative examples, chemicals to be incorporated in large amounts were directly introduced into the Banbury mixer, while chemicals to be incorporated in small amounts were, once they were weighed using the intermediate chemical weighing instruments, introduced into the Banbury mixer. If the chemical measurability was rated −25, adhered portions of the chemical were manually scraped off so that it was incorporated in the correct amount into a rubber composition.

(Abrasion Performance)

Rubber samples were cut out of the sidewalls of the tires. Next, the volume loss of the rubber samples was measured with a LAT tester (laboratory abrasion and skid tester) at a load of 50N, a rate of 20 km/h, and a slip angle of 5°. The volume loss results are expressed as an index, with Comparative Example 1 set equal to 100. A higher index indicates better abrasion resistance.

(Elongation at Break)

Rubber samples were cut out of the sidewalls of the tires. Next, specimens were prepared from the rubber samples using a No. 3 dumbbell die, and then subjected to a tensile test at room temperature in conformity with JIS K 6251 "Rubber, vulcanized or thermoplastics—Determination of tensile stress-strain properties" to measure the elongation at break EB (%). The EB values were used to calculate indices: [(EB of each formulation)/(EB of Comparative Example 1)×100], where the EB value of Comparative Example 1 is set equal to 100. A higher index indicates better elongation at break. The target EB index was 95 or higher.

<Ozone Cracking Resistance Test>

Road tests in a hot climate were conducted in the United Arab Emirates in the Middle East for approximately a year (including summer), and road tests in a cold climate were conducted in Hokkaido, Japan for approximately a year (including winter). The degree of cracking in the tests was evaluated based on the criteria below. A greater number indicates better ozone resistance (cracking resistance). The target number was 3+ or higher.

(Criteria)

1: A crack or break of 3 mm or more was observed.

2: A deep crack of at least 1 mm but less than 3 mm was observed.

3: A deep and relatively large crack of less than 1 mm was observed.

4: A crack or break was barely visible to the naked eye.

5: A crack or break was not visible to the naked eye but visible with a magnifier (×10).

(Discoloration Test)

(1) Outdoor: Evaluation of Brown Discoloration

The tires were left outside in the sun for 6 months (from winter to summer) at Kobe city. Then, a* and b* values were measured using a colorimeter. Based on the values, the brown discoloration was evaluated on a five-point scale according to the criteria below. A greater number indicates a lower degree of brown discoloration. The target number was 3+ or higher.

(Criteria)

1: $-(a^*+b^*) \times 10 \leq -30$

2: $-30 < -(a^*+b^*) \times 10 \leq -20$

3: $-20 < -(a^*+b^*) \times 10 \leq -10$

4: $-10 < -(a^*+b^*) \times 10 \leq 0$

5: $-(a^*+b^*) \times 10 > 0$ (2) Indoor: Evaluation of White Discoloration

The tires were left inside a warehouse for 6 months (from winter to summer) at Kobe city. Then, L* value was measured using a colorimeter. Based on the values, the white discoloration was evaluated on a five-point scale according to the criteria below. A greater number indicates a lower degree of white discoloration. The target number was 3+ or higher.

(Criteria)

1: $100-L^* \leq 60$

2: $60 < 100-L^* \leq 65$

3: $65 < 100-L^* \leq 70$

4: $70 < 100-L^* \leq 75$

5: $100-L^* > 75$

TABLE 2

| | | | Example | | | | | | |
|---|---|---|---|---|---|---|---|---|---|
| | | | 1-1 | 1-2 | 1-3 | 1-4 | 1-5 | 1-6 | 1-7 |
| Formulation (parts by mass) | Rubber component | Natural rubber (TSR20) | 50 | 50 | 50 | 50 | 50 | 50 | 50 |
| | | Synthetic polyisoprene rubber (IR2200) | — | — | — | — | — | — | — |
| | | Polybutadiene rubber (BR1250H) | 25 | 25 | 25 | 25 | 25 | 25 | 25 |
| | | Polybutadiene rubber (VCR617) | 25 | 25 | 25 | 25 | 25 | 25 | 25 |
| | | Polybutadiene rubber (CB29_MES) | — | — | — | — | — | — | — |
| | Carbon black | N550_BET42 | 20 | 19 | 20 | 20 | 17 | 20 | 20 |
| | | N220_BET111 | 10 | 10 | 10 | 10 | 10 | 10 | 10 |
| | Oil | TDAE oil | 3.5 | 3.5 | 3.5 | 3.5 | 3.5 | 3.5 | 3.5 |
| | Tackifier | Marukarez T-100AS | 2.0 | 2.0 | 2.0 | 2.0 | 2.0 | 2.0 | 2.0 |
| | Petroleum-based wax | Trial product | 1.5 | 1.5 | 1.5 | 1.5 | 1.5 | 1.5 | 1.5 |
| | Masterbatch | Masterbatch 1-1 | 3.0 | — | — | — | — | — | — |
| | | Masterbatch 1-2 | — | 5.0 | — | — | — | — | — |
| | | Masterbatch 1-3 | — | — | 2.0 | — | — | — | — |
| | | Masterbatch 1-4 | — | — | — | 1.76 | — | — | — |
| | | Masterbatch 1-5 | — | — | — | — | 7.5 | — | — |
| | | Masterbatch 1-6 | — | — | — | — | — | 3.0 | — |
| | | Masterbatch 1-7 | — | — | — | — | — | — | 3.0 |
| | | Masterbatch 1-8 | — | — | — | — | — | — | — |
| | | Masterbatch 1-9 | — | — | — | — | — | — | — |
| | | Masterbatch 1-10 | — | — | — | — | — | — | — |
| | | Masterbatch 1-11 | — | — | — | — | — | — | — |
| | | Masterbatch 1-12 | — | — | — | — | — | — | — |
| | | Masterbatch 1-13 | — | — | — | — | — | — | — |
| | | Masterbatch 1-14 | — | — | — | — | — | — | — |
| | | Masterbatch 1-15 | — | — | — | — | — | — | — |
| | | Masterbatch 1-16 | — | — | — | — | — | — | — |
| | | Masterbatch 1-17 | — | — | — | — | — | — | — |
| | | Masterbatch 2-1 | — | — | — | — | — | — | — |
| | | Masterbatch 2-2 | — | — | — | — | — | — | — |
| | | Masterbatch 3-1 | — | — | — | — | — | — | — |
| | | Masterbatch 4-1 | — | — | — | — | — | — | — |
| | | Masterbatch 5-1 | — | — | — | — | — | — | — |
| | Surfactant | Newpol PE64 | — | — | — | — | — | — | — |
| | | Newpol PE74 | — | — | — | — | — | — | — |
| | | Ionet DO600 | — | — | — | — | — | — | — |
| | | Ionet PO600 | — | — | — | — | — | — | — |
| | | Polyoxyethylene sorbitan monostearate | — | — | — | — | — | — | — |
| | Antioxidant | Antigene 6C | 3.0 | 3.0 | 3.0 | 3.0 | 3.0 | 3.0 | 3.0 |
| | | TMQ | 1.0 | 1.0 | 1.0 | 1.0 | 1.0 | 1.0 | 1.0 |
| | Stearic acid | Tsubaki | 1.5 | 1.5 | 1.5 | 1.5 | 1.5 | 1.5 | 1.5 |
| | Sulfur | Seimi sulfur OT | 2.0 | 2.0 | 2.0 | 2.0 | 2.0 | 2.0 | 2.0 |
| | Vulcanization accelerator | TBBS | 0.75 | 0.75 | 0.75 | 0.75 | 0.75 | 0.75 | 0.75 |
| | Zinc oxide | Zinc oxide | 4.0 | 4.0 | 4.0 | 4.0 | 4.0 | 4.0 | 4.0 |
| Timing of introducing surfactant | | B: base kneading, F: final kneading | F | F | F | F | F | F | F |
| Evaluation results | | Hardness (Hs, adjusted to 55 ± 1) | — | — | — | — | — | — | — |
| | | Productivity (Target ≥110) | 121 | 120 | 110 | 110 | 115 | 115 | 120 |
| | | Abrasion performance (Target ≥95) | 100 | 99 | 102 | 100 | 95 | 101 | 98 |
| | | Elongation at break (EB index) (Target ≥100) | 105 | 107 | 102 | 103 | 110 | 102 | 99 |
| | | Ozone resistance in hot climate (on a 5-point scale, Target ≥3+) | 4 | 4 | 4 | 4 | 4 | 4 | 4 |
| | | Ozone resistance in cold climate (on a 5-point scale, Target ≥3+) | 4 | 4 | 4 | 4 | 4 | 4 | 4 |
| | | Brown discoloration at Kobe city (on a 5-point scale, Target ≥3+) | 5 | 5 | 5 | 5 | 5 | 5 | 5 |
| | | White discoloration at Kobe city (on a 5-point scale, Target ≥3+) | 5 | 5 | 5 | 5 | 5 | 5 | 5 |

| | | | Example | | | | | | |
|---|---|---|---|---|---|---|---|---|---|
| | | | 1-8 | 1-9 | 1-10 | 1-11 | 1-12 | 1-13 | 1-14 |
| Formulation (parts by mass) | Rubber component | Natural rubber (TSR20) | 50 | 50 | 50 | 50 | 50 | 50 | 40 |
| | | Synthetic polyisoprene rubber (IR2200) | — | — | — | — | — | — | 10 |
| | | Polybutadiene rubber (BR1250H) | 25 | 25 | 25 | 25 | 25 | 25 | 25 |
| | | Polybutadiene rubber (VCR617) | 25 | 25 | 25 | 25 | 25 | 25 | 25 |
| | | Polybutadiene rubber (CB29_MES) | — | — | — | — | — | — | — |
| | Carbon black | N550_BET42 | 20 | 19 | 20 | 20 | 20 | 19 | 20 |
| | | N220_BET111 | 10 | 10 | 10 | 10 | 10 | 10 | 10 |
| | Oil | TDAE oil | 3.5 | 3.5 | 3.5 | 3.5 | 3.5 | 3.5 | 3.5 |
| | Tackifier | Marukarez T-100AS | 2.0 | 2.0 | 2.0 | 2.0 | 2.0 | 2.0 | 2.0 |
| | Petroleum-based wax | Trial product | 1.5 | 1.5 | 1.5 | 1.5 | 1.5 | 1.5 | 1.5 |
| | Masterbatch | Masterbatch 1-1 | — | — | — | — | 3.0 | — | — |
| | | Masterbatch 1-2 | — | — | — | — | — | 5.0 | — |
| | | Masterbatch 1-3 | — | — | — | — | — | — | — |
| | | Masterbatch 1-4 | — | — | — | — | — | — | — |
| | | Masterbatch 1-5 | — | — | — | — | — | — | — |
| | | Masterbatch 1-6 | — | — | — | — | — | — | — |
| | | Masterbatch 1-7 | — | — | — | — | — | — | — |
| | | Masterbatch 1-8 | — | — | — | — | — | — | — |
| | | Masterbatch 1-9 | — | — | — | — | — | — | — |

TABLE 2-continued

|  |  |  |  |  |  |  |  |  |
|---|---|---|---|---|---|---|---|---|
|  |  | Masterbatch 1-10 | — | — | — | — | — | — | — |
|  |  | Masterbatch 1-11 | — | — | — | — | — | — | — |
|  |  | Masterbatch 1-12 | — | — | — | — | — | — | — |
|  |  | Masterbatch 1-13 | — | — | — | — | — | — | 6.0 |
|  |  | Masterbatch 1-14 | — | — | — | — | — | — | — |
|  |  | Masterbatch 1-15 | — | — | — | — | — | — | — |
|  |  | Masterbatch 1-16 | — | — | — | — | — | — | — |
|  |  | Masterbatch 1-17 | — | — | — | — | — | — | — |
|  |  | Masterbatch 2-1 | 3.0 | — | — | — | — | — | — |
|  |  | Masterbatch 2-2 | — | 5.0 | — | — | — | — | — |
|  |  | Masterbatch 3-1 | — | — | 3.0 | — | — | — | — |
|  |  | Masterbatch 4-1 | — | — | — | 3.0 | — | — | — |
|  |  | Masterbatch 5-1 | — | — | — | — | — | — | — |
|  | Surfactant | Newpol PE64 | — | — | — | — | — | — | — |
|  |  | Newpol PE74 | — | — | — | — | — | — | — |
|  |  | Ionet DO600 | — | — | — | — | — | — | — |
|  |  | Ionet PO600 | — | — | — | — | — | — | — |
|  |  | Polyoxyethylene sorbitan monostearate | — | — | — | — | — | — | — |
|  | Antioxidant | Antigene 6C | 3.0 | 3.0 | 3.0 | 3.0 | 3.0 | 3.0 | 0.0 |
|  |  | TMQ | 1.0 | 1.0 | 1.0 | 1.0 | 1.0 | 1.0 | 1.0 |
|  | Stearic acid | Tsubaki | 1.5 | 1.5 | 1.5 | 1.5 | 1.5 | 1.5 | 1.5 |
|  | Sulfur | Seimi sulfur OT | 2.0 | 2.0 | 5.0 | 2.0 | 2.0 | 2.0 | 2.0 |
|  | Vulcanization accelerator | TBBS | 0.75 | 0.75 | 0.75 | 0.75 | 0.75 | 0.75 | 0.75 |
|  | Zinc oxide | Zinc oxide | 4.0 | 4.0 | 4.0 | 4.0 | 4.0 | 4.0 | 4.0 |
| Timing of introducing surfactant | B: base kneading, F: final kneading | | F | F | F | F | B | B | F |
| Evaluation results | Hardness (Hs, adjusted to 55 ± 1) | | — | — | — | — | — | — | — |
|  | Productivity (Target ≥110) | | 122 | 124 | 120 | 120 | 110 | 110 | 114 |
|  | Abrasion performance (Target ≥95) | | 102 | 96 | 103 | 101 | 100 | 99 | 100 |
|  | Elongation at break (EB index) (Target ≥100) | | 105 | 107 | 100 | 100 | 104 | 106 | 101 |
|  | Ozone resistance in hot climate (on a 5-point scale, Target ≥3+) | | 4 | 4+ | 4 | 4 | 4 | 4 | 4 |
|  | Ozone resistance in cold climate (on a 5-point scale, Target ≥3+) | | 4 | 4 | 4 | 4 | 4 | 4 | 4 |
|  | Brown discoloration at Kobe city (on a 5-point scale, Target ≥3+) | | 4+ | 4+ | 4 | 4 | 5 | 5 | 5 |
|  | White discoloration at Kobe city (on a 5-point scale, Target ≥3+) | | 4+ | 4+ | 4 | 4 | 5 | 5 | 5 |

|  |  |  | Example | | | | | | |
|---|---|---|---|---|---|---|---|---|---|
|  |  |  | 1-15 | 1-16 | 1-17 | 1-18 | 1-19 | 1-20 | 1-21 |
| Formulation (parts by mass) | Rubber component | Natural rubber (TSR20) | 40 | 40 | 50 | 50 | 35 | 50 | 50 |
|  |  | Synthetic polyisoprene rubber (IR2200) | 10 | 10 | — | — | — | — | — |
|  |  | Polybutadiene rubber (BR1250H) | 25 | 25 | 25 | 25 | 50 | 25 | 25 |
|  |  | Polybutadiene rubber (VCR617) | 25 | 25 | 25 | 25 | — | 25 | 25 |
|  |  | Polybutadiene rubber (CB29_MES) | — | — | — | — | 20.6 | — | — |
|  | Carbon black | N550_BET42 | 20 | 20 | 20 | 20 | 24 | 20 | 20 |
|  |  | N220_BET111 | 10 | 10 | 10 | 10 | 10 | 10 | 10 |
|  | Oil | TDAE oil | 2.5 | 3.5 | 3.5 | 0.0 | 0.0 | 3.5 | 3.5 |
|  | Tackifier | Marukarez T-100AS | 0.0 | 2.0 | 2.0 | 3.0 | 2.0 | 2.0 | 2.0 |
|  | Petroleum-based wax | Trial product | 1.5 | 1.5 | 1.5 | 1.5 | 1.5 | 4.0 | 1.5 |
|  | Masterbatch | Masterbatch 1-1 | — | — | 3.0 | 6.0 | 3.0 | 3.0 | — |
|  |  | Masterbatch 1-2 | — | — | — | — | — | — | — |
|  |  | Masterbatch 1-3 | — | — | — | — | — | — | — |
|  |  | Masterbatch 1-4 | — | — | — | — | — | — | — |
|  |  | Masterbatch 1-5 | — | — | — | — | — | — | — |
|  |  | Masterbatch 1-6 | — | — | — | — | — | — | — |
|  |  | Masterbatch 1-7 | — | — | — | — | — | — | — |
|  |  | Masterbatch 1-8 | — | — | — | — | — | — | — |
|  |  | Masterbatch 1-9 | — | — | — | — | — | — | — |
|  |  | Masterbatch 1-10 | — | — | — | — | — | — | — |
|  |  | Masterbatch 1-11 | — | — | — | — | — | — | — |
|  |  | Masterbatch 1-12 | — | — | — | — | — | — | — |
|  |  | Masterbatch 1-13 | — | — | — | — | — | — | — |
|  |  | Masterbatch 1-14 | 6.0 | — | — | — | — | — | — |
|  |  | Masterbatch 1-15 | — | 6.0 | — | — | — | — | — |
|  |  | Masterbatch 1-16 | — | — | — | — | — | — | 3.0 |
|  |  | Masterbatch 1-17 | — | — | — | — | — | — | — |
|  |  | Masterbatch 2-1 | — | — | — | — | — | — | — |
|  |  | Masterbatch 2-2 | — | — | — | — | — | — | — |
|  |  | Masterbatch 3-1 | — | — | — | — | — | — | — |
|  |  | Masterbatch 4-1 | — | — | — | — | — | — | — |
|  |  | Masterbatch 5-1 | — | — | — | — | — | — | — |
|  | Surfactant | Newpol PE64 | — | — | — | — | — | — | — |
|  |  | Newpol PE74 | — | — | — | — | — | — | — |
|  |  | Ionet DO600 | — | — | — | — | — | — | — |
|  |  | Ionet PO600 | — | — | — | — | — | — | — |
|  |  | Polyoxyethylene sorbitan monostearate | — | — | — | — | — | — | — |
|  | Antioxidant | Antigene 6C | 3.0 | 3.0 | 7.0 | 7.0 | 3.0 | 3.0 | 3.0 |
|  |  | TMQ | 1.0 | 1.0 | 1.0 | 1.0 | 1.0 | 1.0 | 1.0 |
|  | Stearic acid | Tsubaki | 1.5 | 1.5 | 1.5 | 1.5 | 1.5 | 1.5 | 1.5 |
|  | Sulfur | Seimi sulfur OT | 2.0 | 2.0 | 2.0 | 2.0 | 2.0 | 2.0 | 2.0 |
|  | Vulcanization accelerator | TBBS | 0.75 | 0.75 | 0.75 | 0.75 | 0.75 | 0.75 | 0.75 |

TABLE 2-continued

|  |  |  |  |  |  |  |  |  |
|---|---|---|---|---|---|---|---|---|
| Zinc oxide | Zinc oxide | 4.0 | 1.0 | 4.0 | 4.0 | 4.0 | 4.0 | 4.0 |
| Timing of introducing surfactant | B: base kneading, F: final kneading | F | F | F | F | F | F | F |
| Evaluation results | Hardness (Hs, adjusted to 55 ± 1) | — | — | — | — | — | — | — |
|  | Productivity (Target ≥110) | 113 | 116 | 120 | 120 | 120 | 110 | 121 |
|  | Abrasion performance (Target ≥95) | 100 | 100 | 100 | 100 | 104 | 97 | 100 |
|  | Elongation at break (EB index) (Target ≥100) | 102 | 100 | 104 | 100 | 115 | 100 | 105 |
|  | Ozone resistance in hot climate (on a 5-point scale, Target ≥3+) | 4 | 4 | 5 | 5 | 4 | 5 | 4 |
|  | Ozone resistance in cold climate (on a 5-point scale, Target ≥3+) | 4 | 4 | 5 | 5 | 4 | 5 | 4 |
|  | Brown discoloration at Kobe city (on a 5-point scale, Target ≥3+) | 5 | 5 | 4+ | 5 | 5 | 4 | 5 |
|  | White discoloration at Kobe city (on a 5-point scale, Target ≥3+) | 5 | 5 | 5 | 5 | 5 | 4 | 5 |

TABLE 3

|  |  |  | Comparative Example ||||||||
|---|---|---|---|---|---|---|---|---|---|---|
|  |  |  | 1-1 | 1-2 | 1-3 | 1-4 | 1-5 | 1-6 | 1-7 | 1-8 |
| Formulation (parts by mass) | Rubber component | Natural rubber (TSR20) | 50 | 50 | 50 | 50 | 50 | 50 | 50 | 50 |
|  |  | Synthetic polyisoprene rubber (IR2200) | — | — | — | — | — | — | — | — |
|  |  | Polybutadiene rubber (BR1250H) | 25 | 25 | 25 | 25 | 25 | 25 | 25 | 25 |
|  |  | Polybutadiene rubber (VCR617) | 25 | 25 | 25 | 25 | 25 | 25 | 25 | 25 |
|  |  | Polybutadiene rubber (CB29_MES) | — | — | — | — | — | — | — | — |
|  | Carbon black | N550_BET42 | 21.5 | 15 | 20 | 20 | 20 | 20 | 20 | 20 |
|  |  | N220_BET111 | 10 | 10 | 10 | 10 | 10 | 10 | 10 | 10 |
|  | Oil | TDAE oil | — | 3.5 | 3.5 | 3.5 | 3.5 | 3.5 | 3.5 | 3.5 |
|  | Tackifier | Marukarez T-100AS | 2.0 | 2.0 | 2.0 | 2.0 | 2.0 | 2.0 | 2.0 | 2.0 |
|  | Petroleum-based wax | Trial product | 1.5 | 1.5 | 1.5 | 1.5 | 1.5 | 1.5 | 1.5 | 1.5 |
|  | Masterbatch | Masterbatch 1-1 | — | — | — | — | — | — | — | — |
|  |  | Masterbatch 1-2 | — | — | — | — | — | — | — | — |
|  |  | Masterbatch 1-3 | — | — | — | — | — | — | — | — |
|  |  | Masterbatch 1-4 | — | — | — | — | — | — | — | — |
|  |  | Masterbatch 1-5 | — | — | — | — | — | — | — | — |
|  |  | Masterbatch 1-6 | — | — | — | — | — | — | — | — |
|  |  | Masterbatch 1-7 | — | — | — | — | — | — | — | — |
|  |  | Masterbatch 1-8 | — | 10.0 | — | — | — | — | — | — |
|  |  | Masterbatch 1-9 | — | — | 1.67 | — | — | — | — | — |
|  |  | Masterbatch 1-10 | — | — | — | 3.0 | — | — | — | — |
|  |  | Masterbatch 1-11 | — | — | — | — | 3.0 | — | — | — |
|  |  | Masterbatch 1-12 | — | — | — | — | — | 3.0 | — | — |
|  |  | Masterbatch 1-13 | — | — | — | — | — | — | — | — |
|  |  | Masterbatch 1-14 | — | — | — | — | — | — | — | — |
|  |  | Masterbatch 1-15 | — | — | — | — | — | — | — | — |
|  |  | Masterbatch 1-16 | — | — | — | — | — | — | — | — |
|  |  | Masterbatch 1-17 | — | — | — | — | — | — | — | — |
|  |  | Masterbatch 2-1 | — | — | — | — | — | — | 3.0 | — |
|  |  | Masterbatch 2-2 | — | — | — | — | — | — | — | — |
|  |  | Masterbatch 3-1 | — | — | — | — | — | — | — | — |
|  |  | Masterbatch 4-1 | — | — | — | — | — | — | — | — |
|  |  | Masterbatch 5-1 | — | — | — | — | — | — | — | 3.0 |
|  | Surfactant | Newpol PE64 | — | — | — | — | — | — | — | — |
|  |  | Newpol PE74 | — | — | — | — | — | — | — | — |
|  |  | Ionet DO600 | — | — | — | — | — | — | — | — |
|  |  | Ionet PO600 | — | — | — | — | — | — | — | — |
|  |  | Polyoxyethylene sorbitan monostearate | — | — | — | — | — | — | — | — |
|  | Antioxidant | Antigene 6C | 3.0 | 3.0 | 3.0 | 3.0 | 3.0 | 3.0 | 3.0 | 3.0 |
|  |  | TMQ | 1.0 | 1.0 | 1.0 | 1.0 | 1.0 | 1.0 | 1.0 | 1.0 |
|  | Stearic acid | Tsubaki | 1.5 | 1.5 | 1.5 | 1.5 | 1.5 | 1.5 | 1.5 | 1.5 |
|  | Sulfur | Seimi sulfur OT | 2.0 | 2.0 | 2.0 | 2.0 | 2.0 | 2.0 | 2.0 | 2.0 |
|  | Vulcanization accelerator | TBBS | 0.75 | 0.75 | 0.75 | 0.75 | 0.75 | 0.75 | 0.75 | 0.75 |
|  | Zinc oxide | Zinc oxide | 4.0 | 4.0 | 4.0 | 4.0 | 4.0 | 4.0 | 4.0 | 4.0 |
| Timing of introducing surfactant | B: base kneading, F: final kneading |  | — | F | F | F | F | F | F | F |
| Evaluation results | Hardness (Hs, adjusted to 55 ± 1) |  | — | — | — | — | — | — | — | — |
|  | Productivity (Target ≥110) |  | 100 | 110 | 95 | 99 | 119 | 118 | 120 | 120 |
|  | Abrasion performance (Target ≥95) |  | 100 | 93 | 100 | 102 | 100 | 98 | 102 | 99 |
|  | Elongation at break (EB index) (Target ≥100) |  | 100 | 107 | 100 | 98 | 96 | 92 | 105 | 92 |
|  | Ozone resistance in hot climate (on a 5-point scale, Target ≥3+) |  | 3 | 4 | 4 | 4 | 4 | 4 | 4 | 3 |
|  | Ozone resistance in cold climate (on a 5-point scale, Target ≥3+) |  | 3 | 4 | 4 | 4 | 4 | 4 | 4 | 3 |
|  | Brown discoloration at Kobe city (on a 5-point scale, Target ≥3+) |  | 3 | 5 | 5 | 5 | 5 | 5 | 4+ | 4+ |
|  | White discoloration at Kobe city (on a 5-point scale, Target ≥3+) |  | 3 | 5 | 5 | 5 | 5 | 5 | 4+ | 4 |

TABLE 3-continued

| | | | Comparative Example | | | | | | | |
|---|---|---|---|---|---|---|---|---|---|---|
| | | | 1-9 | 1-10 | 1-11 | 1-12 | 1-13 | 1-14 | 1-15 | 1-16 |
| Formulation (parts by mass) | Rubber component | Natural rubber (TSR20) | 50 | 50 | 50 | 50 | 50 | 40 | 50 | 50 |
| | | Synthetic polyisoprene rubber (IR2200) | — | — | — | — | — | 10 | — | — |
| | | Polybutadiene rubber (BR1250H) | 25 | 25 | 25 | 25 | 25 | 25 | 25 | 25 |
| | | Polybutadiene rubber (VCR617) | 25 | 25 | 25 | 25 | 25 | 25 | 25 | 25 |
| | | Polybutadiene rubber (CB29_MES) | — | — | — | — | — | — | — | — |
| | Carbon black | N550_BET42 | 20 | 20 | 20 | 20 | 20 | 15 | 20 | 20 |
| | | N220_BET111 | 10 | 10 | 10 | 10 | 10 | 10 | 10 | 10 |
| | Oil | TDAE oil | 3.5 | 3.5 | 3.5 | 3.5 | 3.5 | 3.5 | 3.5 | 3.5 |
| | Tackifier | Marukarez T-100AS | 2.0 | 2.0 | 2.0 | 2.0 | 2.0 | 2.0 | 2.0 | 2.0 |
| | Petroleum-based wax | Trial product | 1.5 | 1.5 | 1.5 | 1.5 | 1.5 | 1.5 | 1.5 | 1.5 |
| | Masterbatch | Masterbatch 1-1 | — | — | — | — | — | — | — | — |
| | | Masterbatch 1-2 | — | — | — | — | — | — | — | — |
| | | Masterbatch 1-3 | — | — | — | — | — | — | — | — |
| | | Masterbatch 1-4 | — | — | — | — | — | — | — | — |
| | | Masterbatch 1-5 | — | — | — | — | — | — | — | — |
| | | Masterbatch 1-6 | — | — | — | — | — | — | — | — |
| | | Masterbatch 1-7 | — | — | — | — | — | — | — | — |
| | | Masterbatch 1-8 | — | — | — | — | — | — | — | — |
| | | Masterbatch 1-9 | — | — | — | — | — | 10.0 | — | — |
| | | Masterbatch 1-10 | — | — | — | — | — | — | 3.0 | — |
| | | Masterbatch 1-11 | — | — | — | — | — | — | — | 3.0 |
| | | Masterbatch 1-12 | — | — | — | — | — | — | — | — |
| | | Masterbatch 1-13 | — | — | — | — | — | — | — | — |
| | | Masterbatch 1-14 | — | — | — | — | — | — | — | — |
| | | Masterbatch 1-15 | — | — | — | — | — | — | — | — |
| | | Masterbatch 1-16 | — | — | — | — | — | — | — | — |
| | | Masterbatch 1-17 | — | — | — | — | — | — | — | — |
| | | Masterbatch 2-1 | — | — | — | — | — | — | — | — |
| | | Masterbatch 2-2 | — | — | — | — | — | — | — | — |
| | | Masterbatch 3-1 | — | — | — | — | — | — | — | — |
| | | Masterbatch 4-1 | — | — | — | — | — | — | — | — |
| | | Masterbatch 5-1 | — | — | — | — | — | — | — | — |
| | Surfactant | Newpol PE64 | 1.5 | — | — | — | — | — | — | — |
| | | Newpol PE74 | — | 1.5 | — | — | — | — | — | — |
| | | Ionet DO600 | — | — | 1.5 | — | — | — | — | — |
| | | Ionet PO600 | — | — | — | 1.5 | — | — | — | — |
| | | Polyoxyethylene sorbitan monostearate | — | — | — | — | 1.5 | — | — | — |
| | Antioxidant | Antigene 6C | 3.0 | 3.0 | 3.0 | 3.0 | 3.0 | 3.0 | 3.0 | 3.0 |
| | | TMQ | 1.0 | 1.0 | 1.0 | 1.0 | 1.0 | 1.0 | 1.0 | 1.0 |
| | Stearic acid | Tsubaki | 1.5 | 1.5 | 1.5 | 1.5 | 1.5 | 1.5 | 1.5 | 1.5 |
| | Sulfur | Seimi sulfur OT | 2.0 | 2.0 | 2.0 | 2.0 | 2.0 | 2.0 | 2.0 | 2.0 |
| | Vulcanization accelerator | TBBS | 0.75 | 0.75 | 0.75 | 0.75 | 0.75 | 0.75 | 0.75 | 0.75 |
| | Zinc oxide | Zinc oxide | 4.0 | 4.0 | 4.0 | 4.0 | 4.0 | 4.0 | 4.0 | 4.0 |
| Timing of introducing surfactant B: base kneading, F: final kneading | | | B | B | B | B | B | B | B | B |
| Evaluation results | | Hardness (Hs, adjusted to 55 ± 1) | — | — | — | — | — | — | — | — |
| | | Productivity (Target ≥110) | 89 | 90 | 88 | 90 | 87 | 95 | 92 | 92 |
| | | Abrasion performance (Target ≥95) | 100 | 100 | 100 | 100 | 95 | 94 | 102 | 104 |
| | | Elongation at break (EB index) (Target ≥100) | 100 | 100 | 100 | 100 | 85 | 111 | 100 | 102 |
| | | Ozone resistance in hot climate (on a 5-point scale, Target ≥3+) | 4 | 4 | 4 | 4 | 3 | 4 | 4 | 4 |
| | | Ozone resistance in cold climate (on a 5-point scale, Target ≥3+) | 4 | 4 | 4 | 4 | 3 | 4 | 4 | 4 |
| | | Brown discoloration at Kobe city (on a 5-point scale, Target ≥3+) | 5 | 4+ | 4+ | 4+ | 4+ | 5 | 5 | 5 |
| | | White discoloration at Kobe city (on a 5-point scale, Target ≥3+) | 5 | 4+ | 4+ | 4+ | 4 | 5 | 5 | 5 |

TABLE 4

| | | Amount of normal alkane according to carbon number (in wax) Petroleum-based wax (Trial product) |
|---|---|---|
| Carbon number of normal alkanes | 19 | 0.1 |
| | 20 | 0.29 |
| | 21 | 0.68 |
| | 22 | 1.31 |
| | 23 | 2.32 |
| | 24 | 3.3 |
| | 25 | 4.14 |
| | 26 | 4.38 |
| | 27 | 4.58 |
| | 28 | 3.92 |
| | 29 | 3.92 |
| | 30 | 3.61 |
| | 31 | 4.16 |
| | 32 | 4.13 |

TABLE 4-continued

| | Amount of normal alkane according to carbon number (in wax) Petroleum-based wax (Trial product) |
|---|---|
| 33 | 4.59 |
| 34 | 4.32 |
| 35 | 4.7 |
| 36 | 4.47 |
| 37 | 4.31 |
| 38 | 3.71 |
| 39 | 3.3 |
| 40 | 2.88 |
| 41 | 2.48 |
| 42 | 2.09 |
| 43 | 1.7 |
| 44 | 1.42 |
| 45 | 1.13 |
| 46 | 0.9 |
| 47 | 0.72 |
| 48 | 0.56 |
| 49 | 0.42 |
| 50 | 0.35 |
| 51 | 0.23 |
| 52 | 0.17 |
| 53 | 0.12 |
| 54 | 0.09 |
| 55 | 0.06 |
| Amount of C20 to C32 normal alkanes (% by mass) | 40.7 |
| Amount of C33 to C44 normal alkanes (% by mass) | 40.0 |
| Amount of C45 to C47 normal alkanes (% by mass) | 2.8 |
| Amount of C48 and higher normal alkanes (% by mass) | 2.0 |
| Amount of iso-components (% by mass) | 14.5 |

Tables 2 and 3 show that the tires of the examples in which a mixture of a nonionic surfactant and silica was added as a masterbatch to a rubber component and a phenylenediamine antioxidant, exhibited improved discoloration resistance and improved ozone resistance while maintaining or improving good elongation at break. Furthermore, the rubber compositions for tires could be produced with particularly high efficiency when the respective masterbatches were introduced in the final kneading step.

Examples 2-1 to 2-22, Comparative Examples 2-1 to 2-13

The chemicals used in the examples and comparative examples are collectively listed below.
(Rubber Component)
NR: TSR20
IR: IR2200 available from Zeon Corporation
BR 1: Cobalt-catalyzed high-cis BR (BR150B) available from Ube Industries, Ltd.
BR 2: BUNA-CB24 (BR synthesized using a Nd catalyst) available from Lanxess
BR 3: BR1250H (tin-modified BR polymerized using a lithium initiator, vinyl content: 10% to 13% by mass, Mw/Mn: 1.5, tin atom content: 250 ppm) available from Zeon Corporation
BR 4: VCR617 (SPB-containing BR, SPB content: 17% by mass, melting point of SPB: 200° C.) available from Ube Industries, Ltd.
BR 5: BUNA-CB29 MES (rare earth-catalyzed BR synthesized using a Nd catalyst, containing 37.5 parts by mass of MES per 100 parts by mass of the rubber component) available from Lanxess
(Filler)
Carbon black 1: SHOBLACK N550 (BET value: 42 m$^2$/g) available from Cabot Japan K.K.
Carbon black 2: SHOBLACK N220 (BET value: 111 m$^2$/g) available from Cabot Japan K.K.
Carbon black 3: DIABLACK G (N660, BET value: 32 m$^2$/g) available from Mitsubishi Chemical Corporation
Silica: ULTRASIL VN3Gr (BET value: 175 m$^2$/g) available from Evonik Degussa
(Oil)
Vivatec 500 (TDAE, low polycyclic aroma oil) available from H & R
(Tackifier)
Marukarez T-100AS available from Maruzen Petrochemical Co., Ltd.
(Petroleum-Based Wax)
Trial product described above (petroleum-based wax, normal alkane content: 85% by mass on average)
(Surfactant)
NEWPOL PE-64 (Pluronic type nonionic surfactant, copolymer of PEG/PPG (25/30), represented by the above Formula (I) in which a+c is 25 and b is 30) available from Sanyo Chemical Industries, Ltd.
NEWPOL PE-74 (Pluronic type nonionic surfactant, copolymer of PEG/PPG (30/35), represented by the above Formula (I) in which a+c is 30 and b is 35) available from Sanyo Chemical Industries, Ltd.
Ionet DO600 (main ingredient: a compound represented by Formula (2) in which $R^2$ and $R^3$ are each —$C_{17}H_{33}$, and e is 12) available from Sanyo Chemical Industries, Ltd.
Ionet PO600 (main ingredient: a compound represented by Formula (1) in which $R^1$ is —$C_{17}H_{33}$, and d is 12) available from Sanyo Chemical Industries, Ltd.
Polyoxyethylene sorbitan monostearate available from Kanto Chemical Co., Inc.
(Antioxidant)
Antigene 6C (N-(1,3-dimethylbutyl)-N'-phenyl-p-phenylenediamine (6PPD)) available from Sumitomo Chemical Co., Ltd.
TMQ (poly(2,2,4-trimethyl-1,2-dihydroquinoline)) available from Ouchi Shinko Chemical Industrial Co., Ltd.
(Silane Coupling Agent)
Si75 (bis(3-triethoxysilylpropyl)disulfide) available from Degussa
(Stearic Acid)
Stearic acid "TSUBAKI" available from NOF Corporation
(Sulfur)
5% oil-treated sulfur powder (soluble sulfur containing 5% by mass of oil) available from Tsurumi Chemical Industry Co., Ltd.
(Vulcanization Accelerator)
NOCCELER NS (N-tert-butyl-2-benzothiazolyl sulfenamide) (TBBS) available from Ouchi Shinko Chemical Industrial Co., Ltd.
(Zinc Oxide)
Zinc oxide #2 available from Mitsui Mining and Smelting Co., Ltd.
(Vulcanization Retarder)
PVI (N-(cyclohexylthio)phthalimide) available from Ouchi Shinko Chemical Industrial Co., Ltd.
<Production of Test Tires>
The base kneading step was carried out by kneading the materials in the formulation amounts shown in Table 5 or 6, except the sulfur and vulcanization accelerator, in a 1.7-L Banbury mixer (Kobe Steel, Ltd.) for 5 minutes until the discharge temperature reached 170° C. to obtain a primary kneaded mixture. The sulfur and vulcanization accelerator were added to the primary kneaded mixture, and they were kneaded using an open two-roll mill for 4 minutes until the temperature reached 105° C. to obtain an unvulcanized rubber composition for tires (final kneading step). Here, the surfactants and masterbatches shown in Tables 5 and 6 were introduced in the base kneading step ("B" in the tables).

The unvulcanized rubber compositions for tires thus obtained were formed into the shape of a sidewall and assembled with other tire components to build unvulcanized tires. The unvulcanized tires were vulcanized at 170° C. to prepare test tires (205/65R15). The performance of the test tires was evaluated in the following tests.

Tables 5 and 6 show the results.

(Hardness Measurement)

Rubber samples were cut out of the sidewalls of the tires. Next, the hardness of the rubber samples was measured at 25° C. using a durometer in conformity with JIS K 6253 (Shore A measurement). The formulations of the samples were adjusted to a hardness of 55±1.

(Extrusion Processability)

Extrusion processability was evaluated in terms of the three properties below and expressed as an index. The target index was 90 or higher.

Scorch properties: A longer Mooney scorch time t10 (min) [ML(1+4), 130° C.] leads to less scorch and faster extrusion.

Adhesion to a polymer separator: A smoother extrudate surface with moderate blooms of tacky components results in better adhesion to a polyester sheet as a separator liner.

Uneven shrinkage associated with cooling after extrusion: Samples with 10 parts by mass or more of silica shrink greatly in the areas of low gauge thickness. They curve like banana and are thus difficult to uniformly attach to the inner periphery in a building machine, thereby resulting in deterioration of uniformity.

(Mooney Scorch)

Mooney scorch was evaluated based on the above Mooney scorch time t10 (min) and expressed as an index. The target index was 90 or higher.

(Spew Breaking)

The number of broken spews observed in the sidewalls of 100 test tires of each formulation was counted upon demolding the tires, and expressed as an index using the equation below. A higher index indicates less spew breaking. The target index was 90 or higher.

(Spew breaking index)=(the number of broken spews in Example 13)/(the number of broken spews in each formulation)×100

(Ozone Cracking Resistance Test)

Ozone cracking resistance was evaluated by the same method as above.

(Discoloration Test)

Discoloration was evaluated by the same method as above.

TABLE 5

| | | | Example | Comparative Example | | | | | Example | |
|---|---|---|---|---|---|---|---|---|---|---|
| | | | 2-1 | 2-1 | 2-2 | 2-3 | 2-4 | 2-5 | 2-2 | 2-3 |
| Formulation (parts by mass) | Rubber component | NR (TSR20) | 40 | 40 | 40 | 40 | 40 | 40 | 40 | 40 |
| | | IR (IR2200) | | | | | | | | |
| | | BR1 (BR150B) | 60 | 60 | 60 | 60 | 60 | | 60 | 60 |
| | | BR2 (CB24) | | | | | | | | |
| | | BR3 (BR1250H) | | | | | | | | |
| | | BR4 (VCR617) | | | | | | 60 | | |
| | | BR5 (CB29_MES) | | | | | | | | |
| | Carbon black | Carbon black 1 (N550_BET42) | 52 | 52 | 52 | 52 | 52 | 37 | 51 | 52 |
| | | Carbon black 2 (N220_BET111) | | | | | | | | |
| | | Carbon black 3 (N660_BET32) | | | | | | | | |
| | Silica | VN3_BET175 | | | | | | | | |
| | Oil | TDAE oil | 8.0 | 8.0 | 8.0 | 8.0 | 8.0 | | 8.0 | 8.0 |
| | Tackifier | Marukarez T-100AS | 2.0 | 2.0 | 2.0 | 2.0 | 2.0 | 4.0 | 2.0 | 2.0 |
| | Petroleum-based wax | Trial product | 1.5 | 1.5 | 1.5 | 1.5 | 1.5 | 1.5 | 1.5 | 1.5 |
| | Masterbatch | Masterbatch 1-1 | 3.0 | | | | | | | |
| | | Masterbatch 1-2 | | | | | | | 5.0 | |
| | | Masterbatch 1-3 | | | | | | | | 2.0 |
| | | Masterbatch 1-4 | | | | | | | | |
| | | Masterbatch 1-5 | | | | | | | | |
| | | Masterbatch 1-6 | | | | | | | | |
| | | Masterbatch 1-7 | | | | | | | | |
| | | Masterbatch 1-8 | | | | | | | | |
| | | Masterbatch 1-9 | | | | | | | | |
| | | Masterbatch 1-10 | | | | | | | | |
| | | Masterbatch 1-11 | | | | | | | | |
| | | Masterbatch 1-12 | | | | | | | | |
| | | Masterbatch 1-13 | | | | | | | | |
| | | Masterbatch 1-14 | | | | | | | | |
| | | Masterbatch 1-15 | | | | | | | | |
| | | Masterbatch 1-16 | | | | | | | | |
| | | Masterbatch 1-17 | | | | | | | | |
| | | Masterbatch 2-1 | | | | | | | | |
| | | Masterbatch 2-2 | | | | | | | | |
| | | Masterbatch 3-1 | | | | | | | | |
| | | Masterbatch 4-1 | | | | | | | | |
| | | Masterbatch 5-1 | | | | | | | | |

TABLE 5-continued

|  |  |  |  |  |  |  |  |  |  |
|---|---|---|---|---|---|---|---|---|---|
|  | Surfactant | Newpol PE64 |  |  |  | 1.5 | 1.5 | 1.5 | 1.5 |  |
|  |  | Newpol PE74 |  |  |  |  |  |  |  |  |
|  |  | Ionet DO600 |  |  |  |  |  |  |  |  |
|  |  | Ionet PO600 |  |  |  |  |  |  |  |  |
|  |  | Polyoxyethylene sorbitan monostearate |  |  |  |  |  |  |  |  |
|  | Antioxidant | Antigene 6C | 3.0 | 3.0 | 3.0 | 3.0 | 3.0 | 3.0 | 3.0 | 3.0 |
|  |  | TMQ | 1.0 | 1.0 | 1.0 | 1.0 | 1.0 | 1.0 | 1.0 | 1.0 |
|  | Silica coupling agent | Si75 |  |  |  |  |  |  |  |  |
|  | Stearic acid | Tsubaki | 2.5 | 2.5 | 2.5 | 1.5 | 5.0 | 2.5 | 2.5 | 2.5 |
|  | Sulfur | Sulfur powder containing 5% oil | 1.6 | 1.6 | 1.6 | 1.6 | 1.6 | 1.6 | 1.6 | 1.6 |
|  | Vulcanization accelerator | TBBS | 0.75 | 0.75 | 0.75 | 0.75 | 0.75 | 0.75 | 0.75 | 0.75 |
|  | Zinc oxide | Zinc #2 | 3.0 | 3.0 | 3.0 | 3.0 | 3.0 | 3.0 | 3.0 | 3.0 |
|  | Vulcanization retarder | PVI |  |  |  |  |  |  |  |  |
|  | Timing of introducing surfactant | B: base kneading | B | — | B | B | B | B | B | B |
| Evaluation results | Hardness (Hs, adjusted to 55 ± 1) |  |  |  |  |  |  |  |  |  |
|  | Extrusion processability (Target ≥90) |  | 100 | 100 | 80 | 90 | 75 | 85 | 102 | 95 |
|  | Mooney scorch t10 (min) ML (1 + 4), 130° C. (Target ≥90) |  | 102 | 100 | 78 | 87 | 70 | 95 | 104 | 94 |
|  | Spew breaking (Target ≥90) |  | 101 | 100 | 110 | 85 | 115 | 80 | 102 | 103 |
|  | Ozone resistance in hot climate (on a 5-point scale, Target ≥3+) |  | 4 | 3 | 4 | 4 | 3+ | 4 | 4 | 4 |
|  | Ozone resistance in cold climate (on a 5-point scale, Target ≥3+) |  | 4 | 3 | 4 | 4 | 3+ | 4 | 4 | 4 |
|  | Brown discoloration at Kobe city (on a 5-point scale, Target ≥3+) |  | 5 | 3 | 5 | 5 | 5 | 4+ | 5 | 5 |
|  | White discoloration at Kobe city (on a 5-point scale, Target ≥3+) |  | 5 | 3 | 5 | 5 | 5 | 5 | 5 | 5 |

|  |  |  | Example | | | Comparative Example | | | Example | |
|---|---|---|---|---|---|---|---|---|---|---|
|  |  |  | 2-4 | 2-5 | 2-6 | 2-6 | 2-7 | 2-8 | 2-7 | 2-8 |
| Formulation (parts by mass) | Rubber component | NR (TSR20) | 40 | 40 | 40 | 40 | 40 | 40 | 40 | 40 |
|  |  | IR (IR2200) |  |  |  |  |  |  |  |  |
|  |  | BR1 (BR150B) | 60 | 60 | 60 | 60 | 60 | 60 | 60 | 60 |
|  |  | BR2 (CB24) |  |  |  |  |  |  |  |  |
|  |  | BR3 (BR1250H) |  |  |  |  |  |  |  |  |
|  |  | BR4 (VCR617) |  |  |  |  |  |  |  |  |
|  |  | BR5 (CB29_MES) |  |  |  |  |  |  |  |  |
|  | Carbon black | Carbon black 1 (N550_BET42) | 52 | 52 | 52 | 52 | 52 | 52 | 52 | 52 |
|  |  | Carbon black 2 (N220_BET111) |  |  |  |  |  |  |  |  |
|  |  | Carbon black 3 (N660_BET32) |  |  |  |  |  |  |  |  |
|  | Silica | VN3_BET175 |  |  |  |  |  |  |  |  |
|  | Oil | TDAE oil | 8.0 | 8.0 | 8.0 | 8.0 | 8.0 | 8.0 | 8.0 | 8.0 |
|  | Tackifier | Marukarez T-100AS | 2.0 | 2.0 | 2.0 | 2.0 | 2.0 | 2.0 | 2.0 | 2.0 |
|  | Petroleum-based wax | Trial product | 1.5 | 1.5 | 1.5 | 1.5 | 1.5 | 1.5 | 1.5 | 1.5 |
|  | Masterbatch | Masterbatch 1-1 |  |  |  |  |  |  |  |  |
|  |  | Masterbatch 1-2 |  |  |  |  |  |  |  |  |
|  |  | Masterbatch 1-3 |  |  |  |  |  |  |  |  |
|  |  | Masterbatch 1-4 | 1.8 |  |  |  |  |  |  |  |
|  |  | Masterbatch 1-5 |  |  |  |  |  |  |  |  |
|  |  | Masterbatch 1-6 |  | 3.0 |  |  |  |  |  |  |
|  |  | Masterbatch 1-7 |  |  | 3.0 |  |  |  |  |  |
|  |  | Masterbatch 1-8 |  |  |  |  |  |  |  |  |
|  |  | Masterbatch 1-9 |  |  |  |  |  |  |  |  |
|  |  | Masterbatch 1-10 |  |  |  | 3.0 |  |  |  |  |
|  |  | Masterbatch 1-11 |  |  |  |  | 3.0 |  |  |  |
|  |  | Masterbatch 1-12 |  |  |  |  |  | 3.0 |  |  |
|  |  | Masterbatch 1-13 |  |  |  |  |  |  |  |  |
|  |  | Masterbatch 1-14 |  |  |  |  |  |  |  |  |
|  |  | Masterbatch 1-15 |  |  |  |  |  |  |  |  |
|  |  | Masterbatch 1-16 |  |  |  |  |  |  |  |  |
|  |  | Masterbatch 1-17 |  |  |  |  |  |  | 3.0 |  |
|  |  | Masterbatch 2-1 |  |  |  |  |  |  |  | 3.0 |
|  |  | Masterbatch 2-2 |  |  |  |  |  |  |  |  |
|  |  | Masterbatch 3-1 |  |  |  |  |  |  |  |  |
|  |  | Masterbatch 4-1 |  |  |  |  |  |  |  |  |
|  |  | Masterbatch 5-1 |  |  |  |  |  |  |  |  |
|  | Surfactant | Newpol PE64 |  |  |  |  |  |  |  |  |
|  |  | Newpol PE74 |  |  |  |  |  |  |  |  |
|  |  | Ionet DO600 |  |  |  |  |  |  |  |  |
|  |  | Ionet PO600 |  |  |  |  |  |  |  |  |
|  |  | Polyoxyethylene sorbitan monostearate |  |  |  |  |  |  |  |  |

TABLE 5-continued

| | | | | | | | | | | |
|---|---|---|---|---|---|---|---|---|---|---|
| Antioxidant | | Antigene 6C | 3.0 | 3.0 | 3.0 | 3.0 | 3.0 | 3.0 | 3.0 | 3.0 |
| | | TMQ | 1.0 | 1.0 | 1.0 | 1.0 | 1.0 | 1.0 | 1.0 | 1.0 |
| Silica coupling agent | | Si75 | | | | | | | | |
| Stearic acid | | Tsubaki | 2.5 | 2.5 | 2.5 | 2.5 | 2.5 | 2.5 | 2.5 | 2.5 |
| Sulfur | | Sulfur powder containing 5% oil | 1.6 | 1.6 | 1.6 | 1.6 | 1.6 | 1.6 | 1.6 | 1.6 |
| Vulcanization accelerator | | TBBS | 0.75 | 0.75 | 0.75 | 0.75 | 0.75 | 0.75 | 0.75 | 0.75 |
| Zinc oxide | | Zinc #2 | 3.0 | 3.0 | 3.0 | 3.0 | 3.0 | 3.0 | 3.0 | 3.0 |
| Vulcanization retarder | | PVI | | | | | | | | |
| Timing of introducing surfactant | B: base kneading | | B | B | B | B | B | B | B | B |
| Evaluation results | Hardness (Hs, adjusted to 55 ± 1) | | | | | | | | | |
| | Extrusion processability (Target ≥90) | | 90 | 95 | 101 | 80 | 80 | 80 | 95 | 95 |
| | Mooney scorch t10 (min) ML (1 + 4), 130° C. (Target ≥90) | | 90 | 97 | 105 | 75 | 75 | 75 | 95 | 98 |
| | Spew breaking (Target ≥90) | | 105 | 95 | 101 | 110 | 110 | 110 | 103 | 102 |
| | Ozone resistance in hot climate (on a 5-point scale, Target ≥3+) | | 4 | 4 | 4 | 4 | 4 | 4 | 4 | 4 |
| | Ozone resistance in cold climate (on a 5-point scale, Target ≥3+) | | 4 | 4 | 4 | 4 | 4 | 4 | 4 | 4 |
| | Brown discoloration at Kobe city (on a 5-point scale, Target ≥3+) | | 5 | 5 | 5 | 5 | 5 | 5 | 5 | 4+ |
| | White discoloration at Kobe city (on a 5-point scale, Target ≥3+) | | 5 | 5 | 5 | 5 | 5 | 5 | 5 | 4+ |

| | | | Example | | Comparative Example | | | |
|---|---|---|---|---|---|---|---|---|
| | | | 2-9 | 2-10 | 2-9 | 2-10 | 2-11 | 2-12 |
| Formulation (parts by mass) | Rubber component | NR (TSR20) | 40 | 40 | 40 | 40 | 40 | 40 |
| | | IR (IR2200) | | | | | | |
| | | BR1 (BR150B) | 60 | 60 | 60 | 60 | 60 | 60 |
| | | BR2 (CB24) | | | | | | |
| | | BR3 (BR1250H) | | | | | | |
| | | BR4 (VCR617) | | | | | | |
| | | BR5 (CB29_MES) | | | | | | |
| | Carbon black | Carbon black 1 (N550_BET42) | 52 | 52 | 52 | 52 | 52 | 52 |
| | | Carbon black 2 (N220_BET111) | | | | | | |
| | | Carbon black 3 (N660_BET32) | | | | | | |
| | Silica | VN3_BET175 | | | | | | |
| | Oil | TDAE oil | 8.0 | 8.0 | 8.0 | 8.0 | 8.0 | 8.0 |
| | Tackifier | Marukarez T-100AS | 2.0 | 2.0 | 2.0 | 2.0 | 2.0 | 2.0 |
| | Petroleum-based wax | Trial product | 1.5 | 1.5 | 1.5 | 1.5 | 1.5 | 1.5 |
| | Masterbatch | Masterbatch 1-1 | | | | | | |
| | | Masterbatch 1-2 | | | | | | |
| | | Masterbatch 1-3 | | | | | | |
| | | Masterbatch 1-4 | | | | | | |
| | | Masterbatch 1-5 | | | | | | |
| | | Masterbatch 1-6 | | | | | | |
| | | Masterbatch 1-7 | | | | | | |
| | | Masterbatch 1-8 | | | | | | |
| | | Masterbatch 1-9 | | | | | | |
| | | Masterbatch 1-10 | | | | | | |
| | | Masterbatch 1-11 | | | | | | |
| | | Masterbatch 1-12 | | | | | | |
| | | Masterbatch 1-13 | | | | | | |
| | | Masterbatch 1-14 | | | | | | |
| | | Masterbatch 1-15 | | | | | | |
| | | Masterbatch 1-16 | | | | | | |
| | | Masterbatch 1-17 | | | | | | |
| | | Masterbatch 2-1 | | | | | | |
| | | Masterbatch 2-2 | | | | | | |
| | | Masterbatch 3-1 | 3.0 | | | | | |
| | | Masterbatch 4-1 | | 3.0 | | | | |
| | | Masterbatch 5-1 | | | 3.0 | | | |
| | Surfactant | Newpol PE64 | | | | | | |
| | | Newpol PE74 | | | | | | |
| | | Ionet DO600 | | | | 1.5 | | |
| | | Ionet PO600 | | | | | 1.5 | |
| | | Polyoxyethylene sorbitan monostearate | | | | | | 1.5 |
| | Antioxidant | Antigene 6C | 3.0 | 3.0 | 3.0 | 3.0 | 3.0 | 3.0 |
| | | TMQ | 1.0 | 1.0 | 1.0 | 1.0 | 1.0 | 1.0 |
| | Silica coupling agent | Si75 | | | | | | |

TABLE 5-continued

|  |  |  | | | | | | |
|---|---|---|---|---|---|---|---|---|
|  | Stearic acid | Tsubaki | 2.5 | 2.5 | 2.5 | 2.5 | 2.5 | 2.5 |
|  | Sulfur | Sulfur powder containing 5% oil | 1.6 | 1.6 | 1.6 | 1.6 | 1.6 | 1.6 |
|  | Vulcanization accelerator | TBBS | 0.75 | 0.75 | 0.75 | 0.75 | 0.75 | 0.75 |
|  | Zinc oxide | Zinc #2 | 3.0 | 3.0 | 3.0 | 3.0 | 3.0 | 3.0 |
|  | Vulcanization retarder | PVI | | | | | | |
| Timing of introducing surfactant | B: base kneading | | B | B | B | B | B | B |
| Evaluation results | Hardness (Hs, adjusted to 55 ± 1) | | | | | | | |
|  | Extrusion processability (Target ≥90) | | 96 | 95 | 99 | 76 | 75 | 80 |
|  | Mooney scorch t10 (min) ML (1 + 4), 130° C. (Target ≥90) | | 98 | 95 | 99 | 74 | 72 | 78 |
|  | Spew breaking (Target ≥90) | | 103 | 101 | 100 | 112 | 110 | 110 |
|  | Ozone resistance in hot climate (on a 5-point scale, Target ≥3+) | | 4+ | 4 | 3 | 4 | 4+ | 3 |
|  | Ozone resistance in cold climate (on a 5-point scale, Target ≥3+) | | 4 | 4 | 3 | 4 | 4 | 3 |
|  | Brown discoloration at Kobe city (on a 5-point scale, Target ≥3+) | | 4+ | 4 | 4+ | 5 | 4+ | 4+ |
|  | White discoloration at Kobe city (on a 5-point scale, Target ≥3+) | | 4+ | 4 | 4 | 5 | 4+ | 4 |

TABLE 6

|  |  |  | Example | | Comparative Example | Example | | |
|---|---|---|---|---|---|---|---|---|
|  |  |  | 2-11 | 2-12 | 2-13 | 2-13 | 2-14 | 2-15 |
| Formulation (parts by mass) | Rubber component | NR (TSR20) | 40 | 40 | 40 | 40 | 40 | 40 |
|  |  | IR (IR2200) | | | | | | |
|  |  | BR1 (BR150B) | 60 | 60 | 60 | 60 | 60 | 60 |
|  |  | BR2 (CB24) | | | | | | |
|  |  | BR3 (BR1250H) | | | | | | |
|  |  | BR4 (VCR617) | | | | | | |
|  |  | BR5 (CB29_MES) | | | | | | |
|  | Carbon black | Carbon black 1 (N550_BET42) | 52 | 51 | 49 | 52 | 52 | 52 |
|  |  | Carbon black 2 (N220_BET111) | | | | | | |
|  |  | Carbon black 3 (N660_BET32) | | | | | | |
|  | Silica | VN3_BET175 | | | | | | |
|  | Oil | TDAE oil | 8.0 | 8.0 | 8.0 | 8.0 | 8.0 | 8.0 |
|  | Tackifier | Marukarez T-100AS | 2.0 | 2.0 | 2.0 | 2.0 | 2.0 | 2.0 |
|  | Petroleum-based wax | Trial product | 1.5 | 1.5 | 1.5 | 1.5 | 1.5 | 1.5 |
|  | Masterbatch | Masterbatch 1-1 | 0.4 | 8.0 | 12.0 | 3.0 | 3.0 | 3.0 |
|  |  | Masterbatch 1-2 | | | | | | |
|  |  | Masterbatch 1-3 | | | | | | |
|  |  | Masterbatch 1-4 | | | | | | |
|  |  | Masterbatch 1-5 | | | | | | |
|  |  | Masterbatch 1-6 | | | | | | |
|  |  | Masterbatch 1-7 | | | | | | |
|  |  | Masterbatch 1-8 | | | | | | |
|  |  | Masterbatch 1-9 | | | | | | |
|  |  | Masterbatch 1-10 | | | | | | |
|  |  | Masterbatch 1-11 | | | | | | |
|  |  | Masterbatch 1-12 | | | | | | |
|  |  | Masterbatch 1-13 | | | | | | |
|  |  | Masterbatch 1-14 | | | | | | |
|  |  | Masterbatch 1-15 | | | | | | |
|  |  | Masterbatch 1-16 | | | | | | |
|  |  | Masterbatch 1-17 | | | | | | |
|  |  | Masterbatch 2-1 | | | | | | |
|  |  | Masterbatch 2-2 | | | | | | |
|  |  | Masterbatch 3-1 | | | | | | |
|  |  | Masterbatch 4-1 | | | | | | |
|  |  | Masterbatch 5-1 | | | | | | |
|  | Surfactant | Newpol PE64 | | | | | | |
|  |  | Newpol PE74 | | | | | | |
|  |  | Ionet DO600 | | | | | | |
|  |  | Ionet PO600 | | | | | | |
|  |  | Polyoxyethylene sorbitan monostearate | | | | | | |
|  | Antioxidant | Antigene 6C | 3.0 | 3.0 | 3.0 | 1.5 | 7.0 | 3.0 |
|  |  | TMQ | 1.0 | 1.0 | 1.0 | 1.0 | 1.0 | 1.0 |
|  | Silica coupling agent | Si75 | | | | | | |

TABLE 6-continued

|  |  |  |  |  |  |  |  |  |
|---|---|---|---|---|---|---|---|---|
|  | Stearic acid | Tsubaki | 2.5 | 2.5 | 2.5 | 2.5 | 2.5 | 4.0 |
|  | Sulfur | Sulfur powder containing 5% oil | 1.6 | 1.6 | 1.6 | 1.6 | 1.6 | 1.6 |
|  | Vulcanization accelerator | TBBS | 0.75 | 0.75 | 0.75 | 0.75 | 0.75 | 0.75 |
|  | Zinc oxide | Zinc #2 | 3.0 | 3.0 | 3.0 | 3.0 | 3.0 | 3.0 |
|  | Vulcanization retarder | PVI |  |  |  |  |  |  |
|  | Timing of introducing surfactant | B: base kneading | B | B | B | B | B | B |
| Evaluation results | Hardness (Hs, adjusted to 55 ± 1) |  |  |  |  |  |  |  |
|  | Extrusion processability (Target ≥90) |  | 101 | 90 | 75 | 92 | 92 | 95 |
|  | Mooney scorch t10 (min) ML (1 + 4), 130° C. (Target ≥90) |  | 100 | 102 | 102 | 92 | 92 | 93 |
|  | Spew breaking (Target ≥90) |  | 100 | 101 | 92 | 107 | 107 | 107 |
|  | Ozone resistance in hot climate (on a 5-point scale, Target ≥3+) |  | 3+ | 5 | 5 | 3+ | 5 | 4 |
|  | Ozone resistance in cold climate (on a 5-point scale, Target ≥3+) |  | 3+ | 5 | 5 | 3+ | 5 | 4 |
|  | Brown discoloration at Kobe city (on a 5-point scale, Target ≥3+) |  | 4 | 5 | 5 | 5 | 5 | 5 |
|  | White discoloration at Kobe city (on a 5-point scale, Target ≥3+) |  | 3+ | 5 | 5 | 5 | 5 | 5 |

|  |  |  | Example |  |  |  |  |  |  |
|---|---|---|---|---|---|---|---|---|---|
|  |  |  | 2-16 | 2-17 | 2-18 | 2-19 | 2-20 | 2-21 | 2-22 |
| Formulation (parts by mass) | Rubber component | NR (TSR20) | 40 | 40 | 40 | 40 | 25 | 40 | 40 |
|  |  | IR (IR2200) |  |  |  |  | 15 |  |  |
|  |  | BR1 (BR150B) | 60 | 60 | 60 | 60 | 60 |  |  |
|  |  | BR2 (CB24) |  |  |  |  |  |  | 30 |
|  |  | BR3 (BR1250H) |  |  |  |  |  |  |  |
|  |  | BR4 (VCR617) |  |  |  |  |  | 60 |  |
|  |  | BR5 (CB29_MES) |  |  |  |  |  |  | 41 |
|  | Carbon black | Carbon black 1 (N550_BET42) | 52 | 36 |  | 50 | 45 | 46 | 48 |
|  |  | Carbon black 2 (N220_BET111) |  | 10 |  |  |  |  |  |
|  |  | Carbon black 3 (N660_BET32) |  |  | 62 |  |  |  |  |
|  | Silica | VN3_BET175 |  |  |  |  | 5 | 15 |  |
|  | Oil | TDAE oil | 8.0 | 8.0 | 10.0 | 8.0 | 8.0 | 8.0 | 0.0 |
|  | Tackifier | Marukarez T-100AS | 2.0 | 2.0 | 2.0 | 2.0 | 2.0 | 2.0 | 2.0 |
|  | Petroleum-based wax | Trial product | 1.5 | 1.5 | 1.5 | 1.5 | 1.5 | 1.5 | 1.5 |
|  | Masterbatch | Masterbatch 1-1 | 3.0 | 3.0 | 3.0 | 3.0 | 3.0 | 3.0 | 3.0 |
|  |  | Masterbatch 1-2 |  |  |  |  |  |  |  |
|  |  | Masterbatch 1-3 |  |  |  |  |  |  |  |
|  |  | Masterbatch 1-4 |  |  |  |  |  |  |  |
|  |  | Masterbatch 1-5 |  |  |  |  |  |  |  |
|  |  | Masterbatch 1-6 |  |  |  |  |  |  |  |
|  |  | Masterbatch 1-7 |  |  |  |  |  |  |  |
|  |  | Masterbatch 1-8 |  |  |  |  |  |  |  |
|  |  | Masterbatch 1-9 |  |  |  |  |  |  |  |
|  |  | Masterbatch 1-10 |  |  |  |  |  |  |  |
|  |  | Masterbatch 1-11 |  |  |  |  |  |  |  |
|  |  | Masterbatch 1-12 |  |  |  |  |  |  |  |
|  |  | Masterbatch 1-13 |  |  |  |  |  |  |  |
|  |  | Masterbatch 1-14 |  |  |  |  |  |  |  |
|  |  | Masterbatch 1-15 |  |  |  |  |  |  |  |
|  |  | Masterbatch 1-16 |  |  |  |  |  |  |  |
|  |  | Masterbatch 1-17 |  |  |  |  |  |  |  |
|  |  | Masterbatch 2-1 |  |  |  |  |  |  |  |
|  |  | Masterbatch 2-2 |  |  |  |  |  |  |  |
|  |  | Masterbatch 3-1 |  |  |  |  |  |  |  |
|  |  | Masterbatch 4-1 |  |  |  |  |  |  |  |
|  |  | Masterbatch 5-1 |  |  |  |  |  |  |  |
|  | Surfactant | Newpol PE64 |  |  |  |  |  |  |  |
|  |  | Newpol PE74 |  |  |  |  |  |  |  |
|  |  | Ionet DO600 |  |  |  |  |  |  |  |
|  |  | Ionet PO600 |  |  |  |  |  |  |  |
|  |  | Polyoxyethylene sorbitan monostearate |  |  |  |  |  |  |  |
|  | Antioxidant | Antigene 6C | 3.0 | 3.0 | 3.0 | 3.0 | 3.0 | 3.0 | 3.0 |
|  |  | TMQ | 1.0 | 1.0 | 1.0 | 1.0 | 1.0 | 1.0 | 1.0 |
|  | Silica coupling agent | Si75 |  |  |  |  | 1.2 |  |  |
|  | Stearic acid | Tsubaki | 4.0 | 2.5 | 2.5 | 2.5 | 2.5 | 2.5 | 2.5 |
|  | Sulfur | Sulfur powder containing 5% oil | 1.6 | 1.6 | 1.6 | 1.6 | 1.6 | 1.6 | 1.6 |
|  | Vulcanization accelerator | TBBS | 0.75 | 0.75 | 0.75 | 0.75 | 0.75 | 0.75 | 0.75 |
|  | Zinc oxide | Zinc #2 | 3.0 | 3.0 | 3.0 | 3.0 | 3.0 | 3.0 | 3.0 |
|  | Vulcanization retarder | PVI | 0.20 |  |  |  |  |  |  |
|  | Timing of introducing surfactant | B: base kneading | B | B | B | B | B | B | B |
| Evaluation results | Hardness (Hs, adjusted to 55 ± 1) |  |  |  |  |  |  |  |  |
|  | Extrusion processability (Target ≥90) |  | 110 | 92 | 100 | 105 | 90 | 115 | 91 |
|  | Mooney scorch t10 (min) ML (1 + 4), 130° C. (Target ≥90) |  | 110 | 98 | 99 | 107 | 120 | 102 | 102 |
|  | Spew breaking (Target ≥90) |  | 97 | 108 | 90 | 107 | 107 | 110 | 110 |
|  | Ozone resistance in hot climate (on a 5-point scale, Target ≥3+) |  | 3+ | 4 | 4 | 4 | 4 | 4 | 4 |
|  | Ozone resistance in cold climate (on a 5-point scale, Target ≥3+) |  | 4 | 4 | 4 | 4 | 4 | 4 | 4 |
|  | Brown discoloration at Kobe city (on a 5-point scale, Target ≥3+) |  | 5 | 4+ | 5 | 5 | 5 | 5 | 5 |
|  | White discoloration at Kobe city (on a 5-point scale, Target ≥3+) |  | 3+ | 5 | 5 | 5 | 5 | 5 | 5 |

Tables 5 and 6 show that the tires of the examples in which a mixture of a nonionic surfactant and silica was added as a masterbatch to a rubber component and a phenylenediamine antioxidant, exhibited excellent processability as well as good discoloration resistance and good ozone resistance even though the compositions contained a large amount of carbon black and stearic acid.

Examples 3-1 and 3-2

The chemicals used in the examples and comparative examples are collectively listed below.
(Rubber Component)
NR: TSR20
IR: IR2200 available from Zeon Corporation
BR 1: Cobalt-catalyzed high-cis BR (BR150B) available from Ube Industries, Ltd.
BR 2: BUNA-CB24 (BR synthesized using a Nd catalyst) available from Lanxess
BR 3: BR1250H (tin-modified BR polymerized using a lithium initiator, vinyl content: 10% to 13% by mass, Mw/Mn: 1.5, tin atom content: 250 ppm) available from Zeon Corporation
BR 4: VCR617 (SPB-containing BR, SPB content: 17% by mass, melting point of SPB: 200° C.) available from Ube Industries, Ltd.
BR 5: BUNA-CB29 MES (rare earth-catalyzed BR synthesized using a Nd catalyst, containing 37.5 parts by mass of MES per 100 parts by mass of the rubber component) available from Lanxess
(Filler)
Carbon black 1: SHOBLACK N550 (BET value: 42 m$^2$/g) available from Cabot Japan K.K.
Carbon black 2: SHOBLACK N220 (BET value: 111 m$^2$/g) available from Cabot Japan K.K.
Carbon black 3: DIABLACK G (N660, BET value: 32 m$^2$/g) available from Mitsubishi Chemical Corporation
Silica: ULTRASIL VN3Gr (BET value: 175 m$^2$/g) available from Evonik Degussa
(Oil)
Vivatec 500 (TDAE, low polycyclic aroma oil) available from H & R
(Tackifier)
Marukarez T-100AS available from Maruzen Petrochemical Co., Ltd.
(Petroleum-Based Wax)
Trial product described above (petroleum-based wax, normal alkane content: 85% by mass on average)
(Surfactant)
NEWPOL PE-64 (Pluronic type nonionic surfactant, copolymer of PEG/PPG (25/30), represented by the above Formula (I) in which a+c is 25 and b is 30) available from Sanyo Chemical Industries, Ltd.
NEWPOL PE-74 (Pluronic type nonionic surfactant, copolymer of PEG/PPG (30/35), represented by the above Formula (I) in which a+c is 30 and b is 35) available from Sanyo Chemical Industries, Ltd.
Ionet DO600 (main ingredient: a compound represented by Formula (2) in which R$^2$ and R$^3$ are each —C$_{17}$H$_{33}$, and e is 12) available from Sanyo Chemical Industries, Ltd.
Ionet PO600 (main ingredient: a compound represented by Formula (1) in which R$^1$ is —C$_{17}$H$_{33}$, and d is 12) available from Sanyo Chemical Industries, Ltd.
Polyoxyethylene sorbitan monostearate available from Kanto Chemical Co., Inc.
(Antioxidant)
Antigene 6C (N-(1,3-dimethylbutyl)-N'-phenyl-p-phenylenediamine (6PPD)) available from Sumitomo Chemical Co., Ltd.
TMQ (poly(2,2,4-trimethyl-1,2-dihydroquinoline)) available from Ouchi Shinko Chemical Industrial Co., Ltd.
(Silane Coupling Agent)
Si75 (bis(3-triethoxysilylpropyl)disulfide) available from Degussa
(Stearic Acid)
Stearic acid "TSUBAKI" available from NOF Corporation
(Sulfur)
5% oil-treated sulfur powder (soluble sulfur containing 5% by mass of oil) available from Tsurumi Chemical Industry Co., Ltd.
(Vulcanization Accelerator)
NOCCELER NS (N-tert-butyl-2-benzothiazolyl sulfenamide)(TBBS) available from Ouchi Shinko Chemical Industrial Co., Ltd.
Santocure TBSI (N-tert-butyl-2-benzothiazolyl sulfenimide) available from Flexsys
BEHZ (N,N-di(2-ethylhexyl)-2-benzothiazolyl sulfenamide) available from Kawaguchi Chemical Industry Co., Ltd.
(Zinc Oxide)
Zinc oxide #2 available from Mitsui Mining and Smelting Co., Ltd.
(Vulcanization Retarder)
PVI (N-(cyclohexylthio)phthalimide) available from Ouchi Shinko Chemical Industrial Co., Ltd.
<Production of Test Tires>
The base kneading step was carried out by kneading the materials in the formulation amounts shown in Table 7, except the sulfur and vulcanization accelerator, in a 1.7-L Banbury mixer (Kobe Steel, Ltd.) for 5 minutes until the discharge temperature reached 170° C. to obtain a primary kneaded mixture. Next, the sulfur and vulcanization accelerator were added to the primary kneaded mixture, and they were kneaded using an open two-roll mill for 4 minutes until the temperature reached 105° C. to obtain an unvulcanized rubber composition for tires (final kneading step). Here, the surfactants shown in Table 7 were introduced in the base kneading step ("B" in the table).

The unvulcanized rubber compositions for tires thus obtained were formed into the shape of a sidewall and assembled with other tire components to build unvulcanized tires. The unvulcanized tires were vulcanized at 170° C. to prepare test tires (205/65R15). The performance (hardness measurement, extrusion processability, Mooney scorch, spew breaking, ozone cracking resistance test) of the test tires was evaluated as described above. The performance results (indexes, etc.) are expressed as relative values compared to Comparative Example 2-1.

Table 7 shows the results.

TABLE 7

|  |  |  | Example 3-1 | Example 3-2 |
|---|---|---|---|---|
| Formulation (parts by mass) | Rubber component | NR (TSR20) | 40 | 40 |
|  |  | IR (IR2200) |  |  |
|  |  | BR1 (BR150B) | 60 | 60 |
|  |  | BR2 (CB24) |  |  |
|  |  | BR3 (BR1250H) |  |  |
|  |  | BR4 (VCR617) |  |  |
|  |  | BR5 (CB29 MES) |  |  |
|  | Carbon black | Carbon black 1 (N550 BET42) | 52 | 52 |
|  |  | Carbon black 2 (N220 BET111) |  |  |
|  |  | Carbon black 3 (N660 BET32) |  |  |
|  | Silica | VN3 BET175 |  |  |
|  | Oil | TDAE oil | 8.0 | 8.0 |
|  | Tackifier | Marukarez T-100AS | 2.0 | 2.0 |
|  | Petroleum-based wax | Trial product | 1.5 | 1.5 |
|  | Surfactant | Newpol PE64 | 1.5 | 1.5 |
|  |  | Newpol PE74 |  |  |
|  |  | Ionet DO600 |  |  |
|  |  | Ionet PO600 |  |  |
|  |  | Polyoxyethylene sorbitan monostearate |  |  |
|  | Antioxidant | Antigene 6C | 3.0 | 3.0 |
|  |  | TMQ | 1.0 | 1.0 |
|  | Silica coupling agent | Si75 |  |  |
|  | Stearic acid | Tsubaki | 2.5 | 2.5 |
|  | Sulfur | Sulfur powder containing 5% oil | 1.6 | 1.6 |
|  | Vulcanization accelerator | TBBS |  |  |
|  |  | TBSI | 0.80 |  |
|  |  | BEHZ |  | 1.50 |
|  | Zinc oxide | Zinc #2 | 3.0 | 3.0 |
|  | Vulcanization retarder | PVI |  |  |
| Timing of introducing surfactant |  | B: base kneading | B | B |
| Evaluation results |  | Hardness (Hs, adjusted to 55 ± 1) |  |  |
|  |  | Extrusion processability (Target ≥90) | 97 | 101 |
|  |  | Mooney scorch t10 (min) ML (1 + 4), 130° C. (Target ≥90) | 95 | 105 |
|  |  | Spew breaking (Target ≥90) | 101 | 100 |
|  |  | Ozone resistance in hot climate (on a 5-point scale, Target ≥3+) | 4 | 4 |
|  |  | Ozone resistance in cold climate (on a 5-point scale, Target ≥3+) | 4 | 4 |
|  |  | Brown discoloration at Kobe city (on a 5-point scale, Target ≥3+) | 5 | 5 |
|  |  | White discoloration at Kobe city (on a 5-point scale, Target ≥3+) | 5 | 5 |

Table 7 shows that the tires of the examples in which a specific vulcanization accelerator such as TBSI or BEHZ was further incorporated in addition to a rubber component, a phenylenediamine antioxidant, a specific nonionic surfactant, and silica, also exhibited excellent processability as well as good discoloration resistance and good ozone resistance even though the compositions contained a large amount of carbon black and stearic acid.

The invention claimed is:
1. A rubber composition for tires, comprising:
a rubber component;
a phenylenediamine antioxidant; and
a masterbatch,
the masterbatch comprising a nonionic surfactant and a silica having a BET value of 40 to 250 m²/g at a mass ratio of 1:5 to 1:0.15, the nonionic surfactant being at least one selected from the group consisting of a poloxamer nonionic surfactant of Formula (I), a nonionic surfactant of Formula (1), and a noinionic surfactant of Formula (2) below,
the rubber component comprising a diene rubber in an amount of 70% to 100% by mass based on 100% by mass of the rubber component,
the rubber composition comprising, per 100 parts by mass of the rubber component, 1.0 to 10.0 parts by mass of the phenylenediamine antioxidant and 0.1 to 5.0 parts by mass of the nonionic surfactant introduced in the form of the masterbatch,

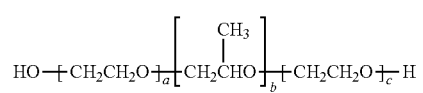

(I)

wherein a, b, and c each represent an integer,

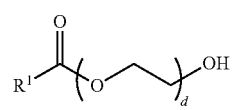

(1)

wherein R¹ represents a C6-C26 hydrocarbon group, and d represents an integer,

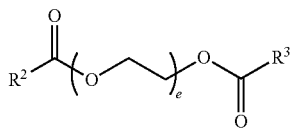

(2)

wherein $R^2$ and $R^3$ are the same as or different from one another and each represent a C6-C26 hydrocarbon group, and e represents an integer.

2. The rubber composition for tires according to claim 1, wherein the silica used in the masterbatch has a BET value of 110 to 200 m²/g, and the masterbatch comprises the nonionic surfactant and the silica at a mass ratio of 1:1.5 to 1:0.2.

3. The rubber composition for tires according to claim 1, wherein the masterbatch is introduced in a final kneading step.

4. A rubber composition for tires, comprising:
a rubber component;
a phenylenediamine antioxidant;
at least one nonionic surfactant selected from the group consisting of a poloxamer nonionic surfactant, a nonionic surfactant of Formula (1), and a nonionic surfactant of Formula (2) below;
carbon black;
silica;
stearic acid; and
a vulcanization accelerator represented by Formula (3) below,
the rubber component comprising a diene rubber in an amount of 70% to 100% by mass based on 100% by mass of the rubber component,
the rubber composition comprising, per 100 parts by mass of the rubber component, 1.0 to 10.0 parts by mass of the phenylenediamine antioxidant, a total of 0.1 to 5.0 parts by mass of the at least one nonionic surfactant, 46 parts by mass or more of the carbon black, 15 parts by mass or less of the silica, and 2.2 to 4.0 parts by mass of the stearic acid,

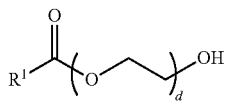

(1)

wherein $R^1$ represents a C6-C26 hydrocarbon group, and d represents an integer,

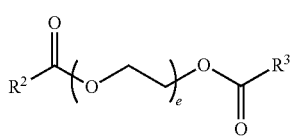

(2)

wherein $R^2$ and $R^3$ are the same as or different from one another and each represent a C6-C26 hydrocarbon group, and e represents an integer,

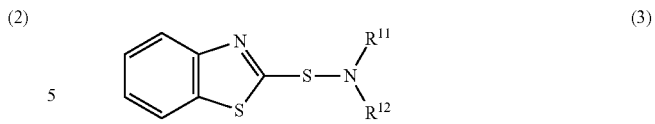

(3)

wherein $R^{11}$ represents a C2-C16 alkyl group, and $R^{12}$ represents a C3-C16 branched alkyl group or a benzothiazolylsulfide group.

5. The rubber composition for tires according to claim 1, further comprising a petroleum-based wax in an amount of 0 to 6.0 parts by mass per 100 parts by mass of the rubber component.

6. The rubber composition for tires according to claim 5, wherein the petroleum-based wax comprises, based on 100% by mass of the petroleum-based wax, a total of 25% to 50% by mass of C20 to C32 normal alkanes and a total of 25% to 50% by mass of C33 to C44 normal alkanes.

7. A pneumatic tire comprising one or more outer layers formed from the rubber composition according to claim 1.

8. A pneumatic tire, formed from the rubber composition for tires according to claim 1.

9. A method for producing a rubber composition for tires, the method comprising:
a base kneading step including mixing and kneading a rubber component and a phenylenediamine antioxidant; and
a final kneading step including adding a vulcanizing agent and a masterbatch to a mixture obtained in the base kneading step and kneading them,
the masterbatch comprising a nonionic surfactant and a silica having a BET value of 40 to 250 m²/g at a mass ratio of 1:5 to 1:0.15, the nonionic surfactant being at least one selected from the group consisting of a poloxamer nonionic surfactant, a nonionic surfactant of Formula (1), and a nonionic surfactant of Formula (2) below,

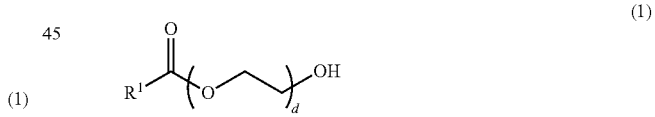

(1)

wherein $R^1$ represents a C6-C26 hydrocarbon group, and d represents an integer,

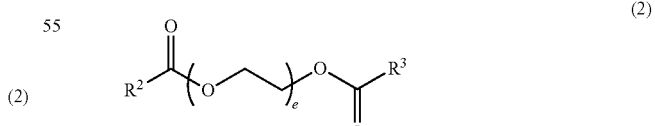

(2)

wherein $R^2$ and $R^3$ are the same as or different from one another and each represent a C6-C26 hydrocarbon group, and e represents an integer.

10. The rubber composition for tires according to claim 4, wherein the poloxamer nonionic surfactant is a nonionic surfactant represented by Formula (I) below,

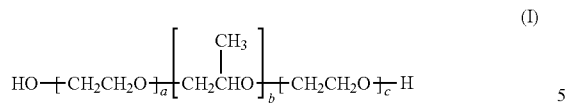
(I)
wherein a, b, and c each represent an integer.
11. The method for producing a rubber composition for tires according to claim 9, wherein the poloxamer nonionic surfactant is a nonionic surfactant represented by Formula (I) below,
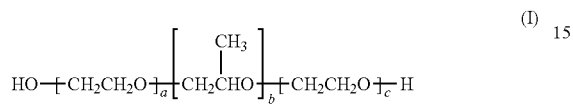
(I)
wherein a, b, and c each represent an integer.
* * * * *